United States Patent [19]
Bertram

[11] Patent Number: 5,345,086
[45] Date of Patent: Sep. 6, 1994

[54] AUTOMATIC MAP COMPILATION SYSTEM

[75] Inventor: Sidney Bertram, Woodland Hills, Calif.

[73] Assignee: Eaton Corporation, Cleveland, Ohio

[21] Appl. No.: 318,538

[22] Filed: Oct. 24, 1963

Related U.S. Application Data

[63] Continuation-in-part of Ser. No. 240,638, Nov. 28, 1962.

[51] Int. Cl.⁵ .............................................. G01C 11/12
[52] U.S. Cl. ........................................ 250/558; 356/12
[58] Field of Search ............. 178/6.5; 88/14 E, 29 M, 88/24 H, 24; 250/220, 558; 356/12

*Primary Examiner*—Mark Hellner
*Attorney, Agent, or Firm*—C. H. Grace

[57] ABSTRACT

An automatic map complication system, for deriving information from a pair of stereoscopic photographs by scanning portions thereof which represent homologous imagery comprising:

first means for scanning at least portions of a pair of stereoscopic photographs and developing video signals in accordance therewith;

second means, including computing means, operable in a sequence of cycles of operation, for estimating for successive cycles of operation, on the basis of at least photogrammetric data related to said pair of photographs, the portions of said photographs which represent homologous imagery and controlling said first means to synchronously scan said portions; and third means responsive to said video signals for comparing said video signals therein and producing error signals which represent the degree of error in said second means in estimating said portions of said photographs as representing homologous imagery, said second means including means responsive to said error signals for updating the estimate of the locations of portions of said photographs, which represent homologous imagery, adjacent the scanned portions.

45 Claims, 13 Drawing Sheets

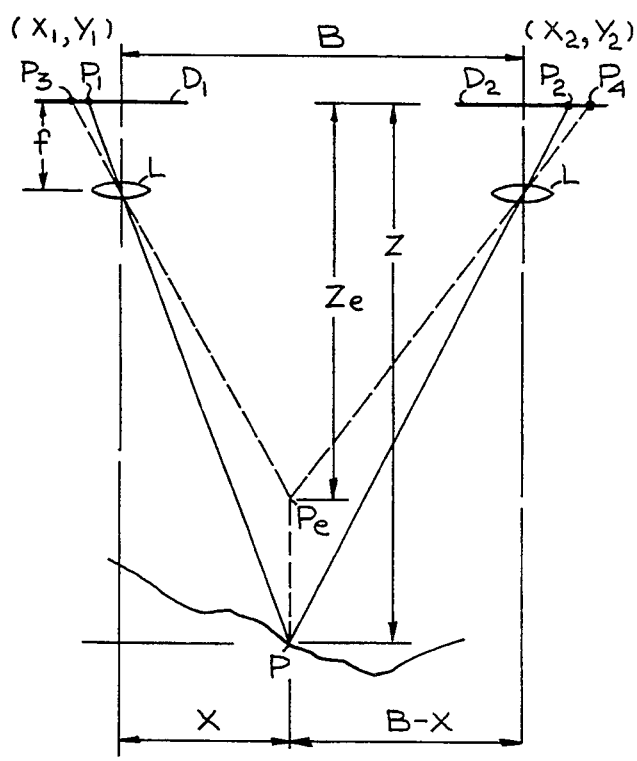
Fig. 1
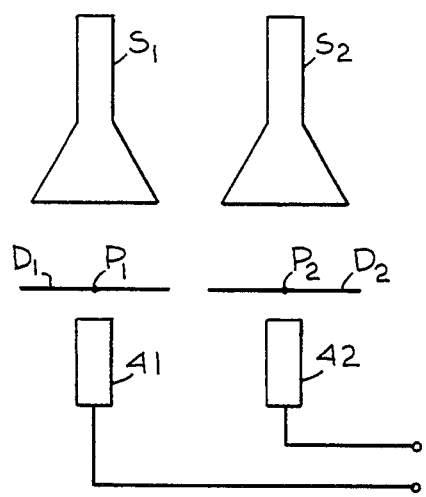
Fig. 2
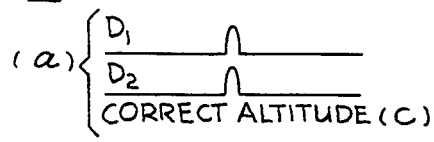
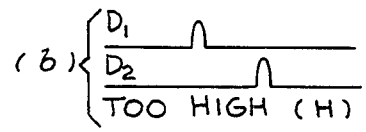
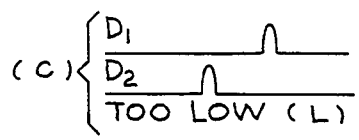
Fig. 5
Fig. 6

COMPLETE SCAN

Z SCAN

LEFT

RIGHT

TOP

BOTTOM

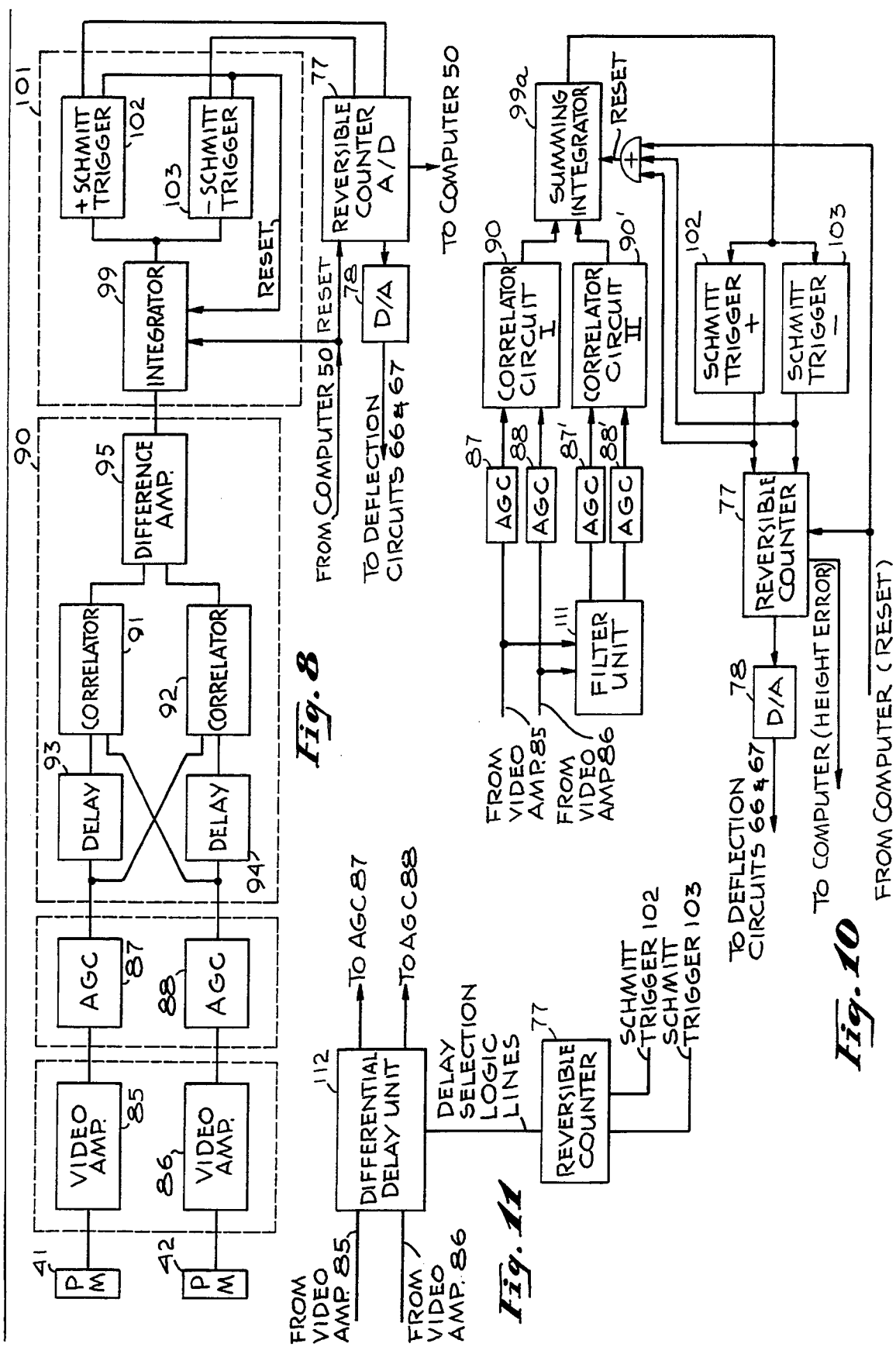

| | |
|---|---|
| 0.00 | — INPUT GRAY CODE & ELEVATION CORRECTION |
| 0.62 | — NEW HEIGHT IS ESTIMATED |
| 2.47 | — NEW PHOTOGRAPH COORDINATES ARE CALCULATED |
| 5.03 | — COORDINATES ARE IN OUTPUT FORMAT |
| 8.16 | — OUTPUT COORDINATES APPLIED THROUGH DIGITAL TO ANALOG CONVERTERS |
| 9.67 | — OUTPUT RASTER TILT INFORMATION |
| 10.78 | — OUTPUT ALTITUDE INTERVAL CODE |
| 15.37 | — RETURN TO BEGINNING OF LOOP |
| 0.00 | |

MILLISECONDS

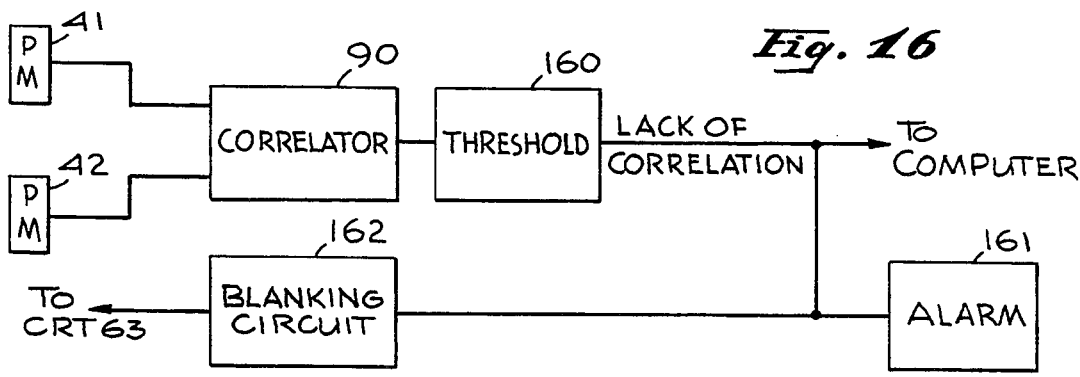
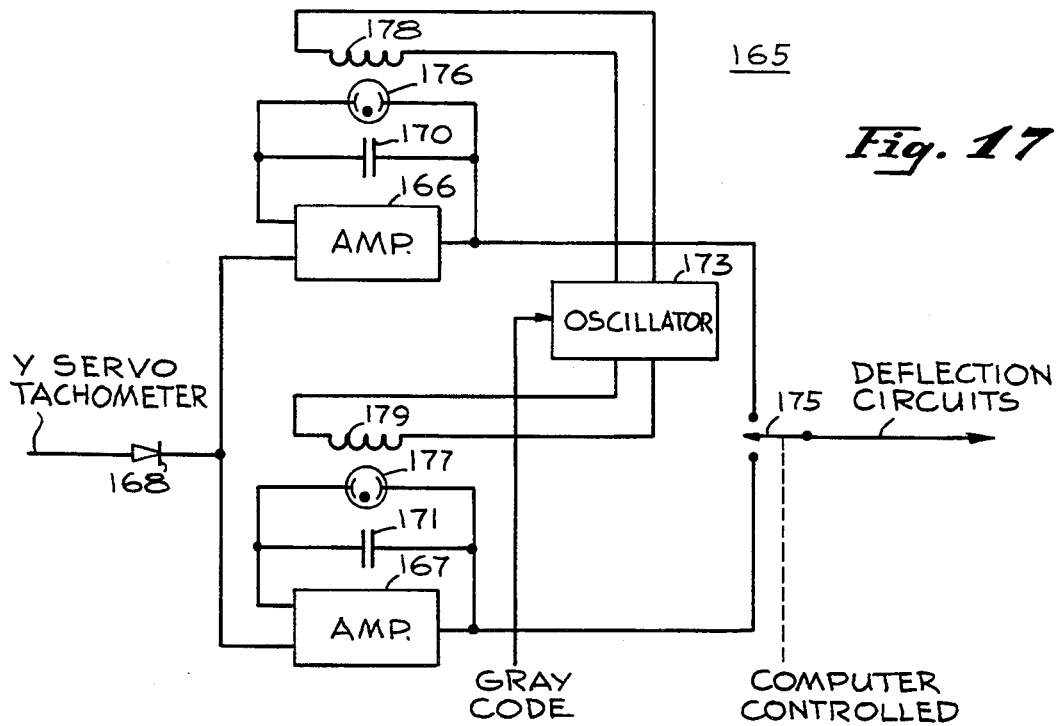
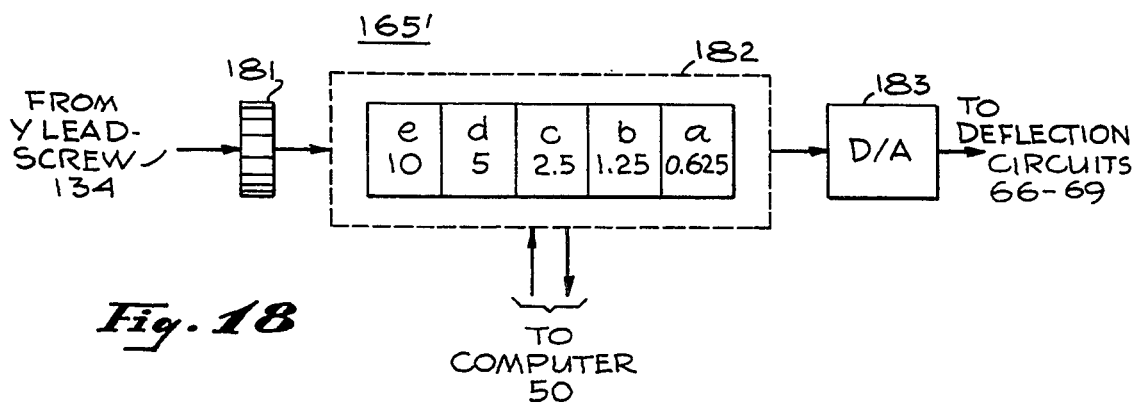

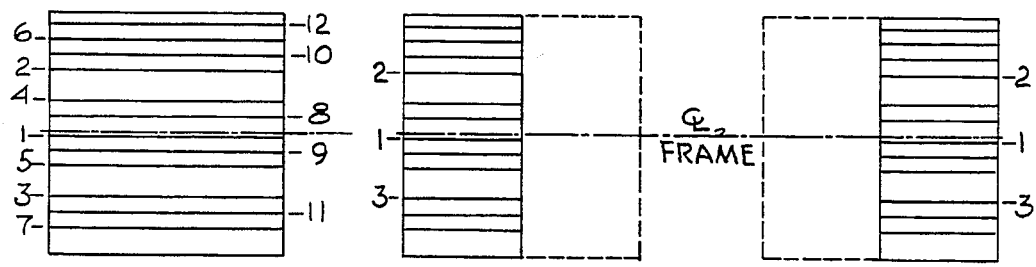
Fig. 23(a) Fig. 23(b) Fig. 23(c)
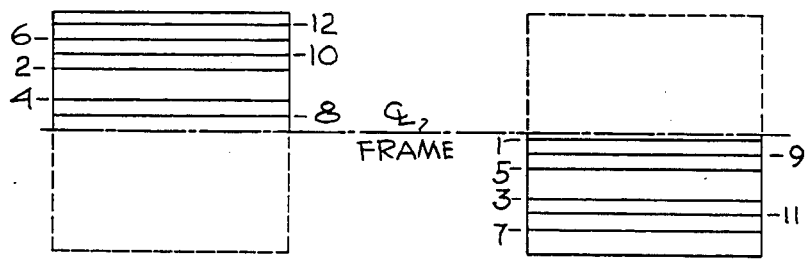
Fig. 23(d) Fig. 23(e)
Fig. 24
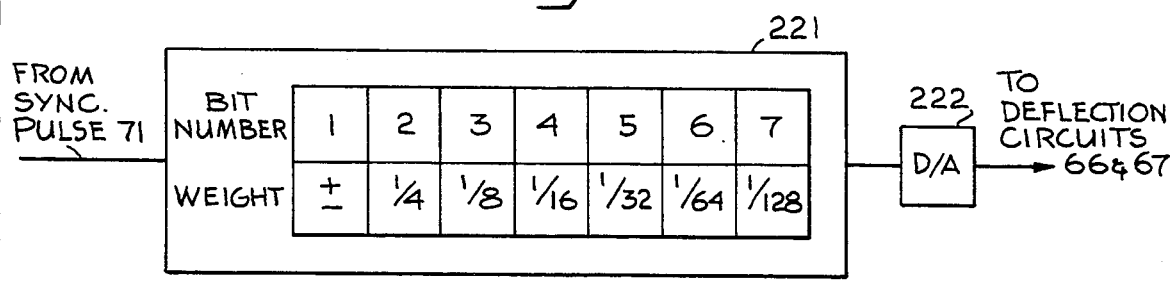
Fig. 25
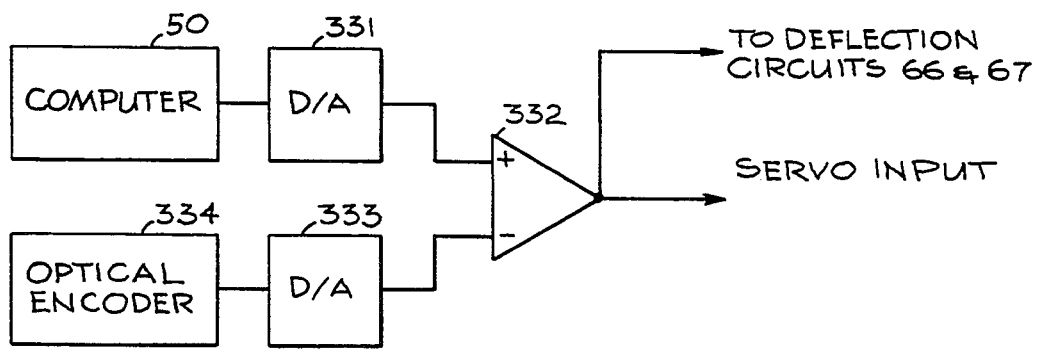

AUTOMATIC MAP COMPILATION SYSTEM

The present application is a continuation in-part of copending application Ser. No. 240,635, filed Nov. 28, 1962, and assigned to the same assignee as the present invention.

This invention relates to automatic compilation systems and more particularly to a system for automatically compiling maps by automatically deriving topographic information from a pair of stereoscopic photographs of actual terrain, and producing an orthographic projection photo and an elevation or altitude chart therefrom.

There are a number of seemingly unrelated fields which share a common problem, that of deriving or transferring information relating to three dimensional aspects of particular surfaces from two dimensional aspects of the same surfaces. Some obvious examples may be found in the fields of map making, surveying, machine tool control, pattern and die making, and highway construction, to name but a few. In some of these cases, automatic reproduction techniques have been employed which control a copying and recording mechanism from the contour of an actual model. This, of course, is not feasible in some fields, such as topographic map making, in which the requisite information cannot be derived automatically from the actual terrain with any degree of practicability. Even in those cases where previously known automatic reproduction techniques are feasible:, they are generally limited by some kind of direct coupling between the contour model and the copying or recording mechanism. In any case, the known reproduction techniques may be considerably improved with resulting substantial savings in time, effort, money and equipment required, through resort to photographic reproduction of the particular surface with respect to which information is desired, provided there is some system for simply, precisely, and automatically deriving the desired information from photographs of the original surface.

The need for such a system has been particularly acute in land surveying operations, which are laborious, costly and time consuming when used for obtaining terrain information for the production of maps. In recent times, aerial photographs have been widely used for obtaining the desired terrain information, thereby greatly simplifying the field operations. However, the process of extracting the desired data from the photographs has also been a tedious and time consuming task. Conventionally, aerial photographs taken in an airplane flying over a particular region in a predetermined pattern have been stereoscopically viewed in order to derive actual terrain information from the data in the photographs. The Kelsh plotter for example, is an instrument wherein a virtual image of the overlapping area of the two photographs shows the terrain in true relief. Measurements made by skilled personnel on this image yield the positions of the various elevation contours. An automatic Stereomapping system, which is the subject matter of copending application Ser. No. 199,797, filed Jun. 4, 1962, represents one solution to the automation of this task. The system disclosed therein represents a considerable improvement over previously known processes by automating conventional photogrammetric techniques. However, the system utilizes a modified Kelsh plotter, thus necessarily involving equipment which is limited in speed and versatility by virtue of its mechanical projection system and related apparatus. Furthermore, although the degree of dependence upon skilled personnel in the production of the desired mapping and contour information is materially reduced in the automatic stereomapping system from that which had previously been required, the operation of the system still requires considerable operator attention, particularly in making the initial adjustments prior to beginning the automatic processing of the information provided in the stereoscopic photographs.

The system of the present invention departs from previously known systems and techniques known in the art of photogrammetry and represents a new and novel solution to the automatic extraction of terrain information from stereoscopic photographs; it operates with higher accuracy and greater speed than any systems hitherto used. Further, the novel system of the present invention extracts altitude data of the terrain in the photographs in digital form which may be stored and used in applications other than map making. Although the present invention will be described in the context of map making and more specifically in producing orthographic projections of the terrain in the stereoscopic photographs and altitude charts thereof, it should be borne in mind that the principles of the present invention are not limited thereto; the specific examples used hereafter are presented four explanatory purposes only.

It is therefore a general object of this invention to provide an improved system for automatically deriving suitable contour information from stereoscopic photographs.

It is a further object of this invention to provide an automatic profiling system operating from photographs used to provide input information, which system is faster and more versatile than previously known arrangements.

It is a specific object of this invention to provide an automatic: map compilation system which is easier to use and whose operation demands less attention from skilled operators than previously known compilation systems.

It is also a specific object of this invention to provide an automatic map compilation system which derives terrain information of high accuracy.

A further object of this invention is to provide an automatic map compilation system which is so arranged as to be adaptable to anticipate future requirements and further developments.

In brief, the system of the present invention utilizes a digital computer to control an analog system wherein a pair of stereoscopic photographs are scanned, and signals modulated by the terrain imagery details in the photographs are processed to determine the altitude of the area scanned. The system may also provide specific output information in the form of an altitude chart showing contour intervals of the terrain area in the photographs. The system may further produce a new photograph or orthophoto wherein the imagery of the terrain appears in true orthographic projection. The processing of the photographs is accomplished by using analog techniques in combination with a small digital computer, which is used to perform the calculations involved in relating the terrain three dimensional coordinates with the two dimensional coordinates of the photographs and to provide all necessary links between the analog and the digital subsystems.

In one particular arrangement in accordance with the invention, a pair of stereoscopic photographs or positive transparencies, known as diapositives, made from original film negatives, which for convenience are assumed to be included in the term "photographs" used hereinafter, are positioned on a table along with a pair of photosensitive film sheets on which the orthophoto and altitude chart are to be printed. The table is movable along two coordinates so as to permit analysis of the photographs in a predetermined pattern. Profiling is achieved by moving the photographs under a pair of flying spot scanners, which, through associated lens systems, project individual light beams to selected incremental portions of the respective photographs. The orthophoto and the altitude chart film sheets, which are moved with the photographs, are in proximity to two cathode ray tubes which are controlled to print out the desired information. By having the photographs and the printout film sheets on the same table, increased precision in the positioning of the respective portions of the photographs and film sheets is achieved.

The projected light beams of the flying spot scanners are modulated by the photographic detail of the photographs and picked up by corresponding photomultiplier tubes where they are converted into related electrical signals. These electrical signals, though substantially similar to each other in content, may be displaced in phase (relative time occurrence) depending upon the degree of coincidence of the terrain detail represented by the respective incremental areas which are being synchronously scanned. The corresponding electrical signals from the photomultipliers are processed by employing correlation methods in order to derive a height error signal from the relative phase displacement between the two signals. In accordance with an aspect of the invention, the height error signal is applied as a deflection control signal to the deflection circuit of one or both light beams so that the incremental areas scanned produce related electrical signals having substantially zero phase displacement. The required amount of deflection control signal is also provided as a digital input to a digital computer so that it can keep track of elevation changes. The computer then provides a signal to control the cathode ray tube employed for printing out the altitude chart.

The processing of the electrical signals is accomplished by using analog and digital techniques in combination with a small digital computer, which is used to perform the calculations involved in relating the terrain three dimensional coordinates (X, Y, Z) to the two dimensional coordinates of the photographs ($X_1$, $Y_1$, $X_2$, $Y_2$) and to provide all necessary links between the analog and digital subsystems. For example, the position of the carriage is monitored or controlled by the digital computer. Information relating to the positions and orientation of the cameras at the time the aerial photographs were taken, and other related optical factors, together with correcting information to compensate for aberrations in the camera lens systems and in the uniformity and dimensional stability of the photographs, is fed into the computer and is incorporated in the calculations performed therein in accordance with transformation equations which are integrated into the computer program.

Digital techniques are employed wherever the accuracy requirement is higher than can readily be obtained with analog devices; analog devices are used where moderate accuracy is sufficient, and where the operation would tax the speed limit and capacity of the digital computer.

In accordance with another aspect of the invention, part of the information relating the terrain coordinates to the coordinates of the photographs is automatically provided to the computer when the photographs are entered in the system during the initial alignment procedure. Thus the amount of preparation and programming necessary before the system may be automatically operated is materially reduced. Furthermore, the use of a combination of analog techniques to correlate the information on the photographs forming the stereo pair and digital techniques to determine the magnitude of any height error and to make the required transformations, substantially increases the speed with which a stereo pair can be processed. The speed of response and accuracy in positioning the selected photograph areas for scanning are further enhanced in accordance with an aspect of the invention by providing for control of both light beams by a combination of lens servo systems and the deflection circuitry of the light beam sources. The lens positioning servos, being electromechanical, are inherently limited in their speed of response to the control signals from the computer; however, a servo error signal is provided to the deflection circuits to cause the light beams to move so as to compensate for any deviation from desired position of the lens system, thus achieving an effective instantaneous response of the beam positioning portion of the system. In accordance with a further aspect of the invention, a stop motion circuit is provided to deflect the scanning beam in accordance with the movement of the photographs for each incremental area being scanned, thus eliminating undesired relative motion between the scanning beams and the photographs during automatic scanning. Once the profiling operation has been initiated, operation is entirely automatic except for areas where the terrain character is not suited to automatic operation. Arrangements are provided in accordance with the invention to vary the usual automatic scanning procedure to compensate for such areas insofar as it is feasible. Where automatic operation is impossible, the system is arranged to provide a signal for an attendant operator who will then assume manual control of the profiling operation until automatic operation is again suitable.

A better understanding of the present invention may be had from the following detailed description, taken in conjunction with the accompanying drawings, wherein like reference numerals are employed to refer to like elements and in which:

FIG. 1 is a diagram helpful in explaining the principles of automatic scanning of stereoscopic photographs;

FIG. 2 represents a simplified arrangement for deriving video signals from imagery detail;

Figure 4:
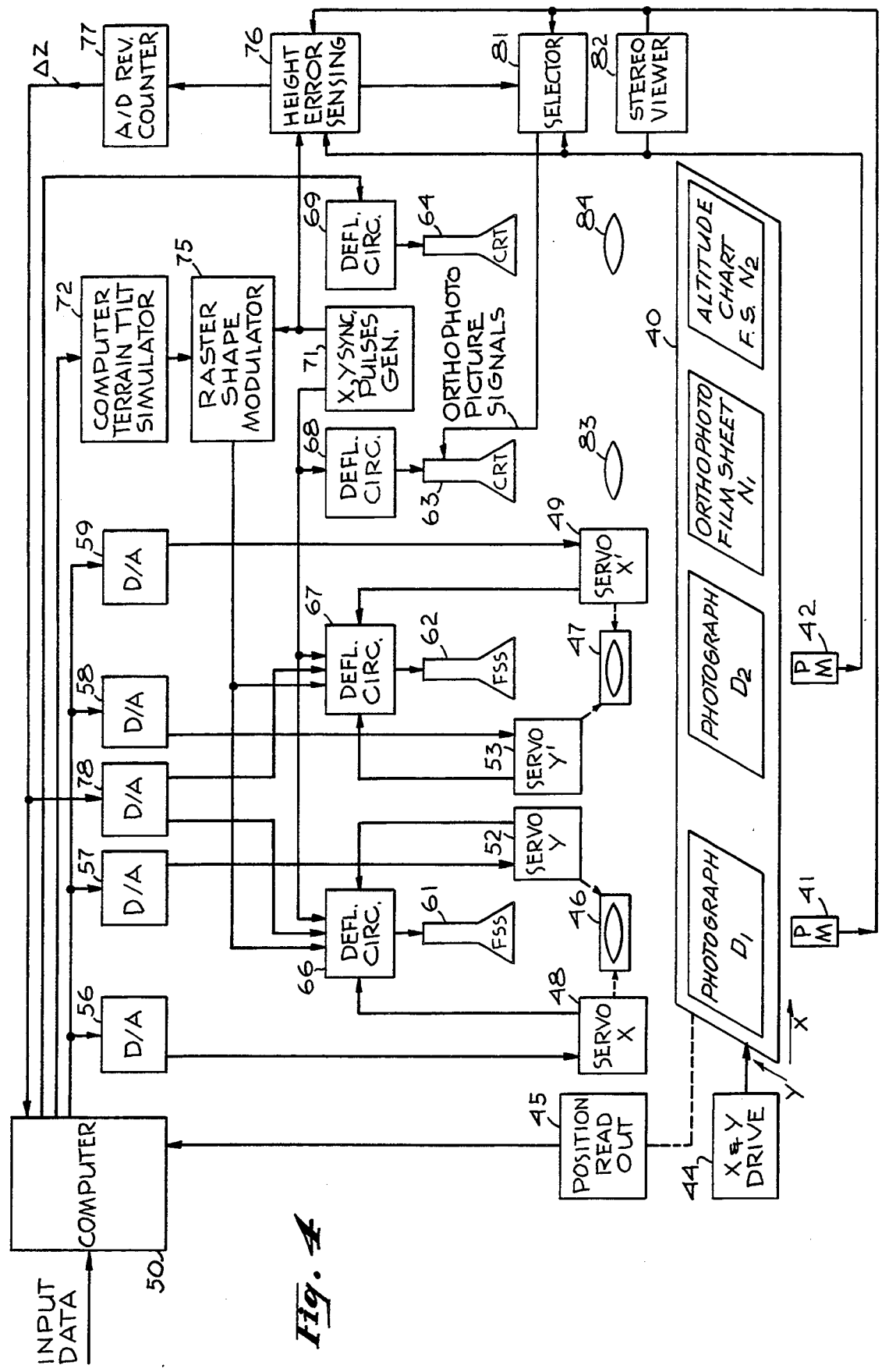
Figure 9:
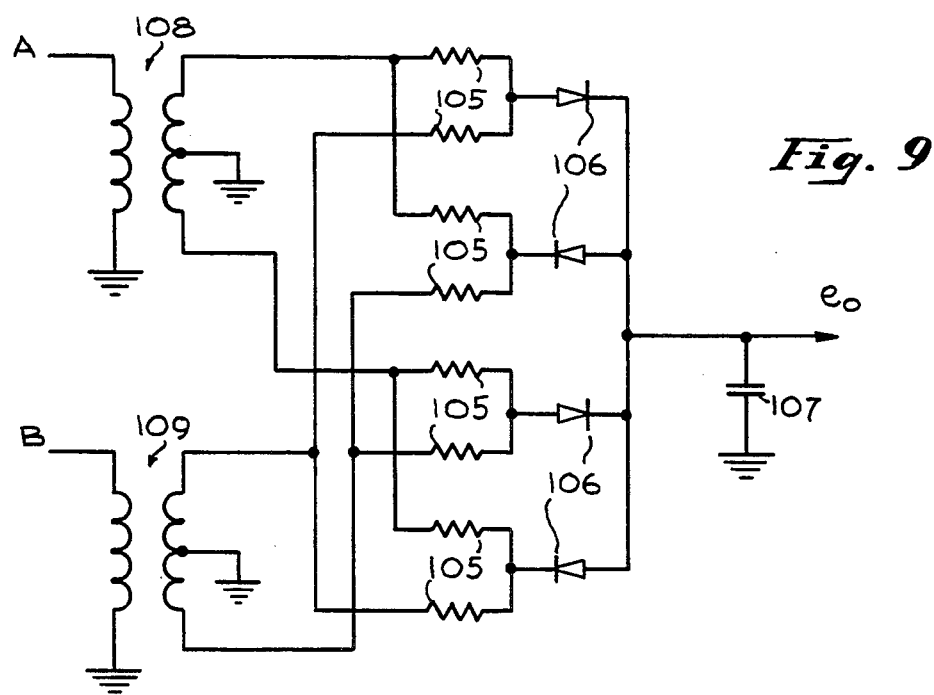
Figure 12:
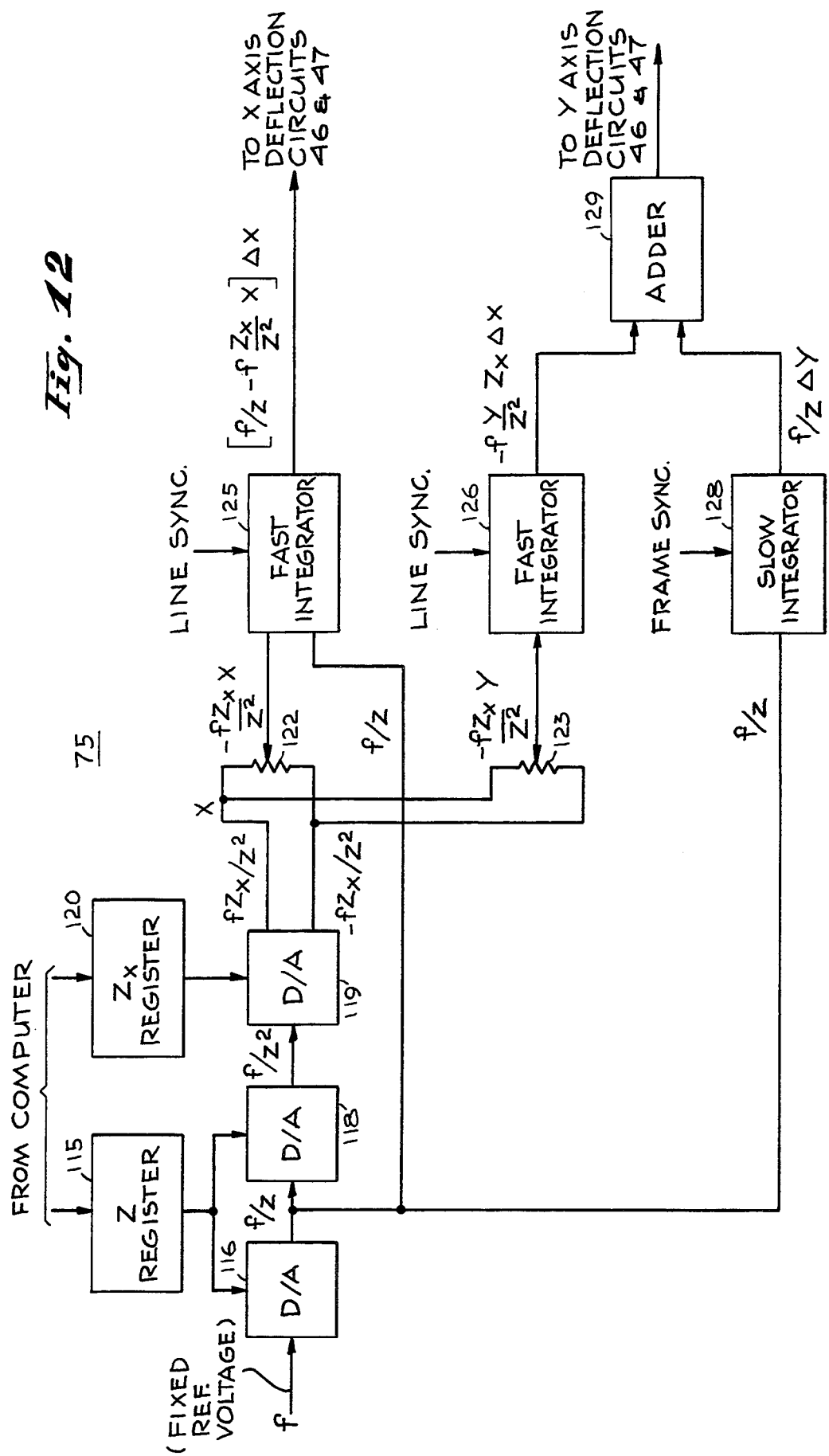
Figure 13:
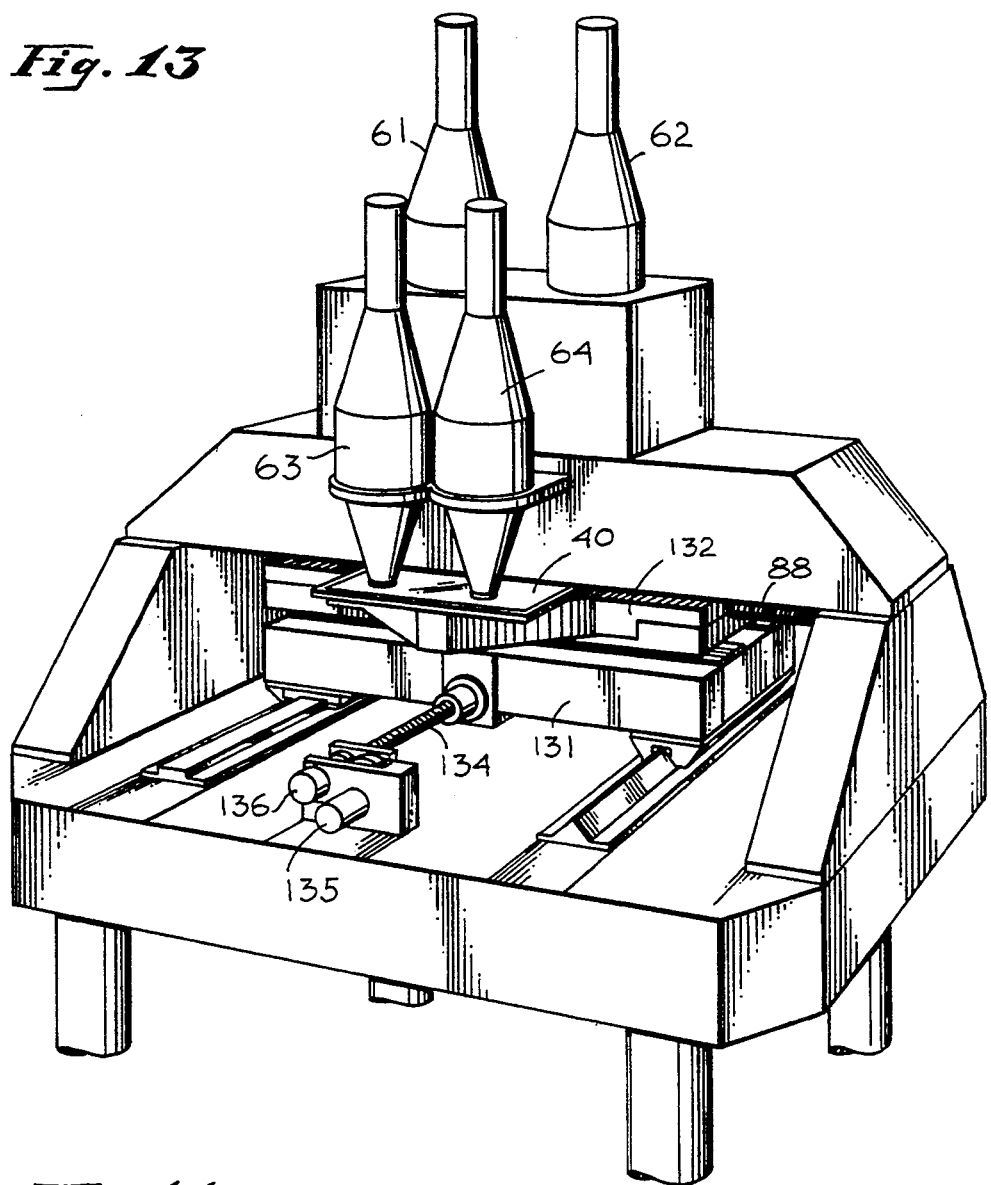
Figure 14:
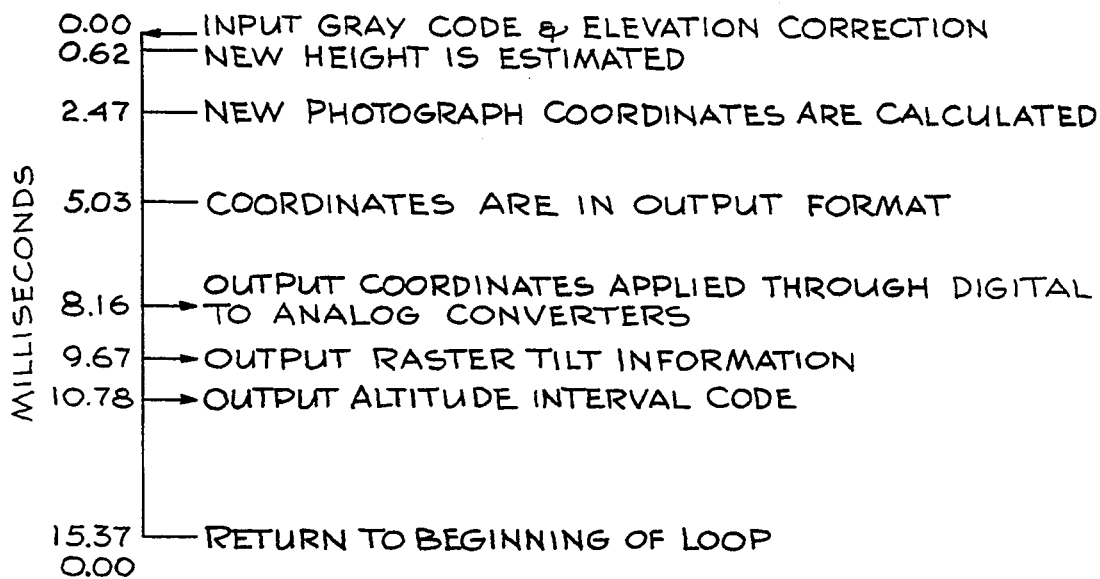
Figure 15A:
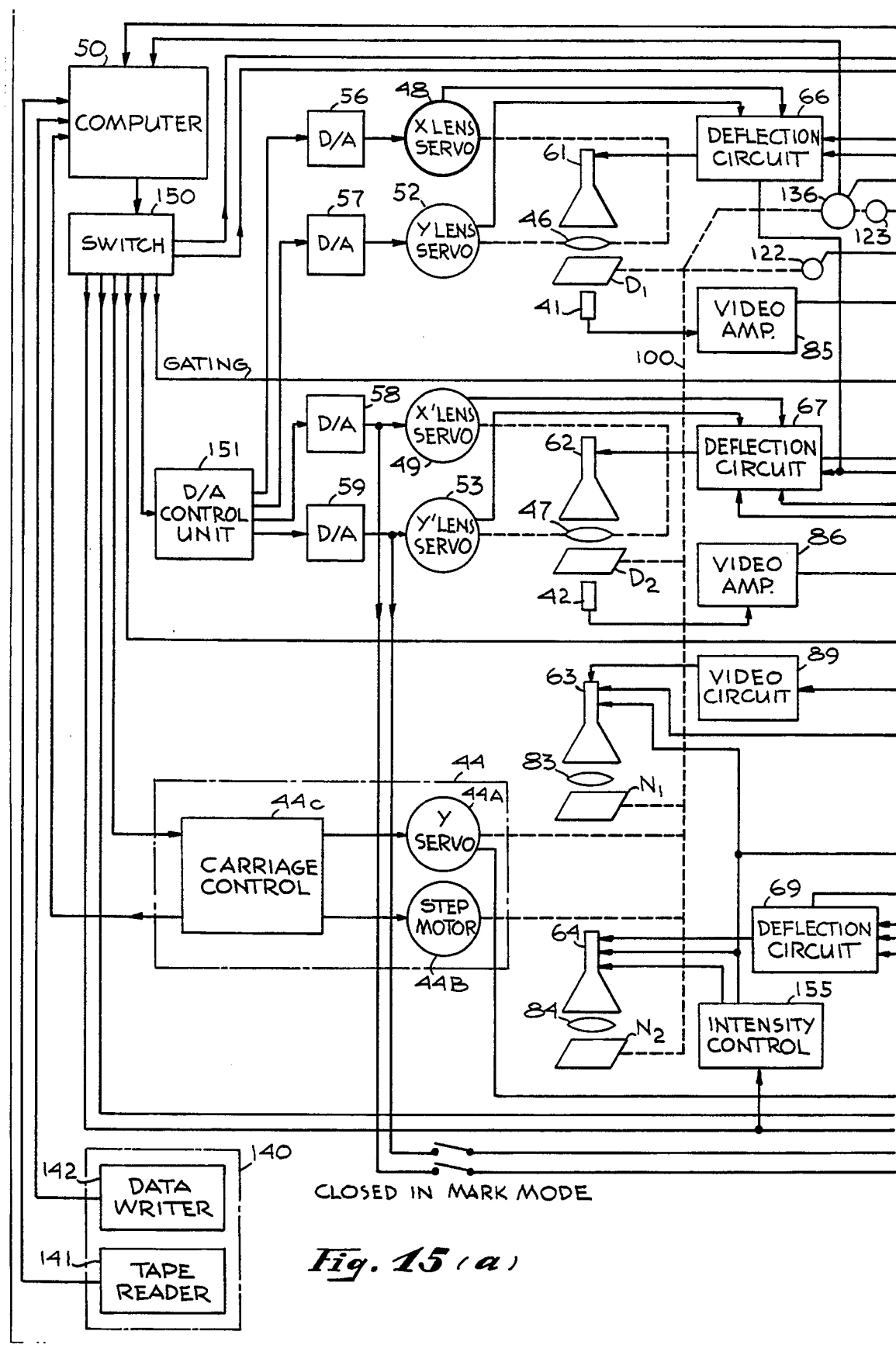
Figure 15B:
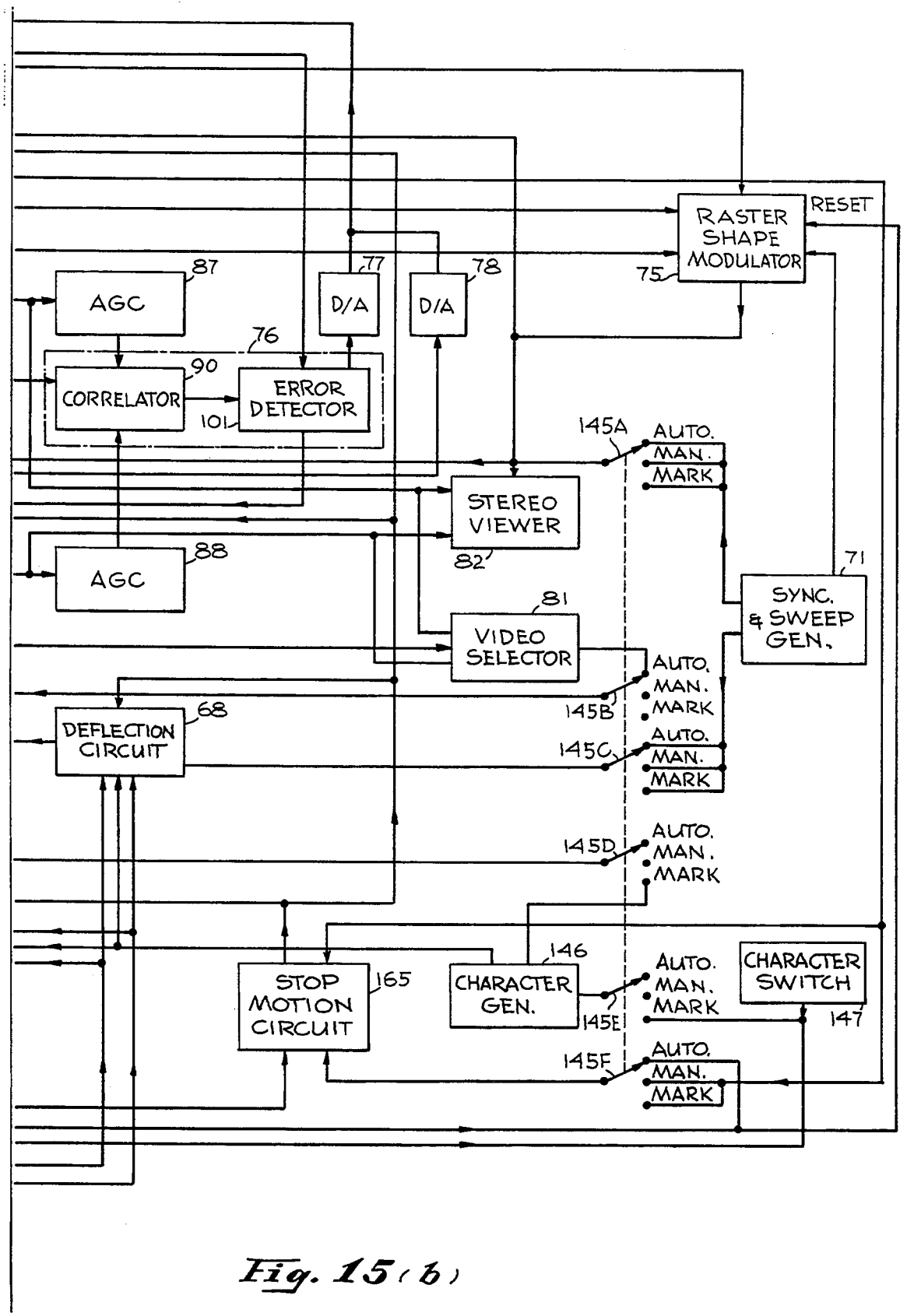
Figure 19:
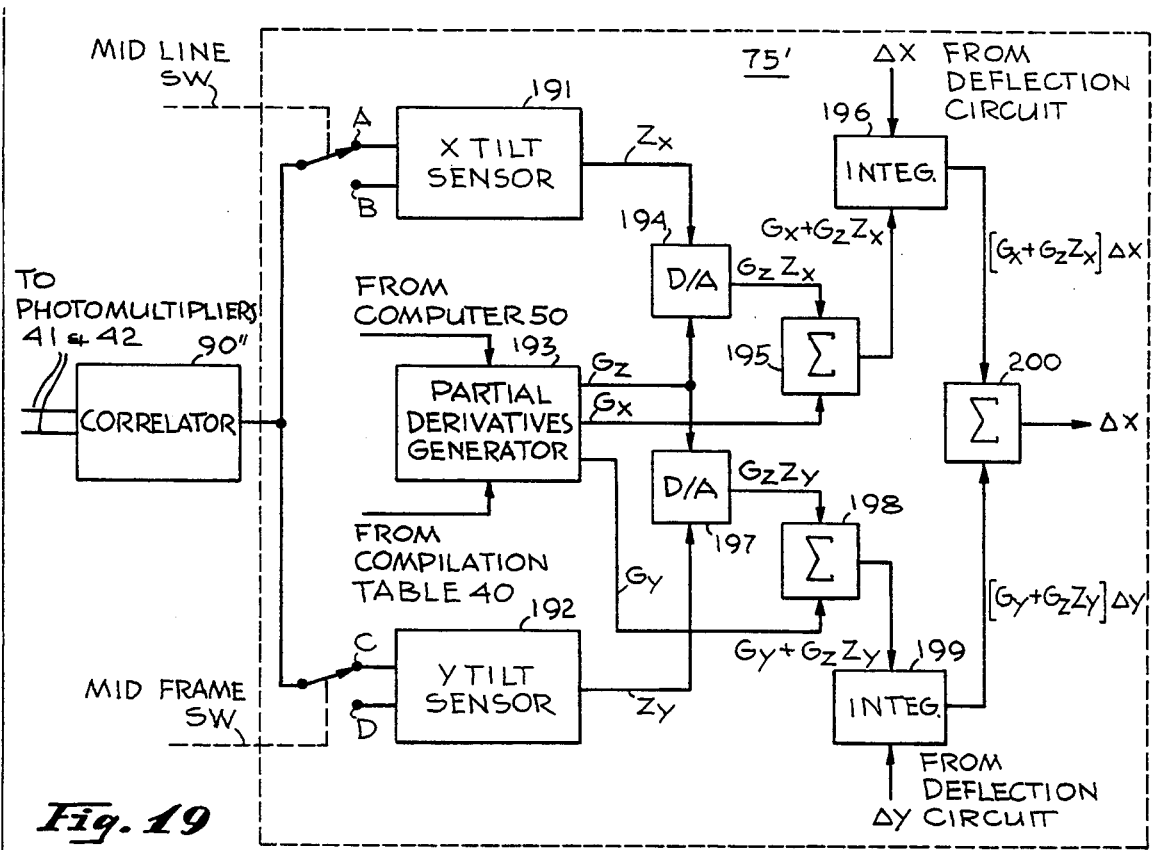
Figure 20:
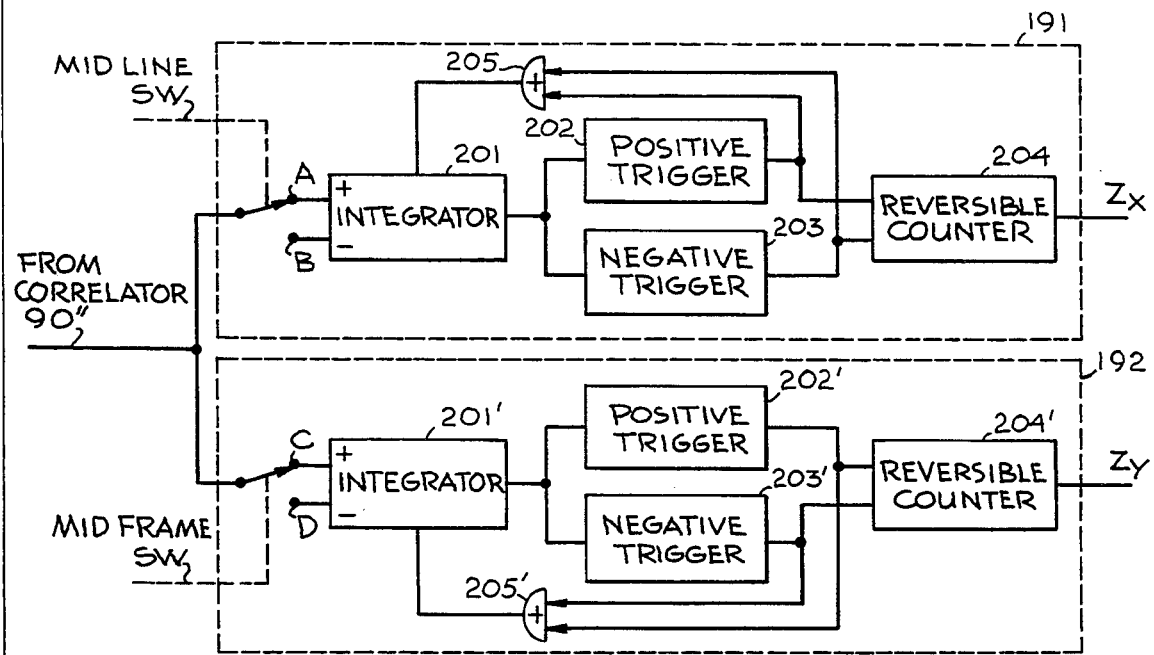
Figure 21:
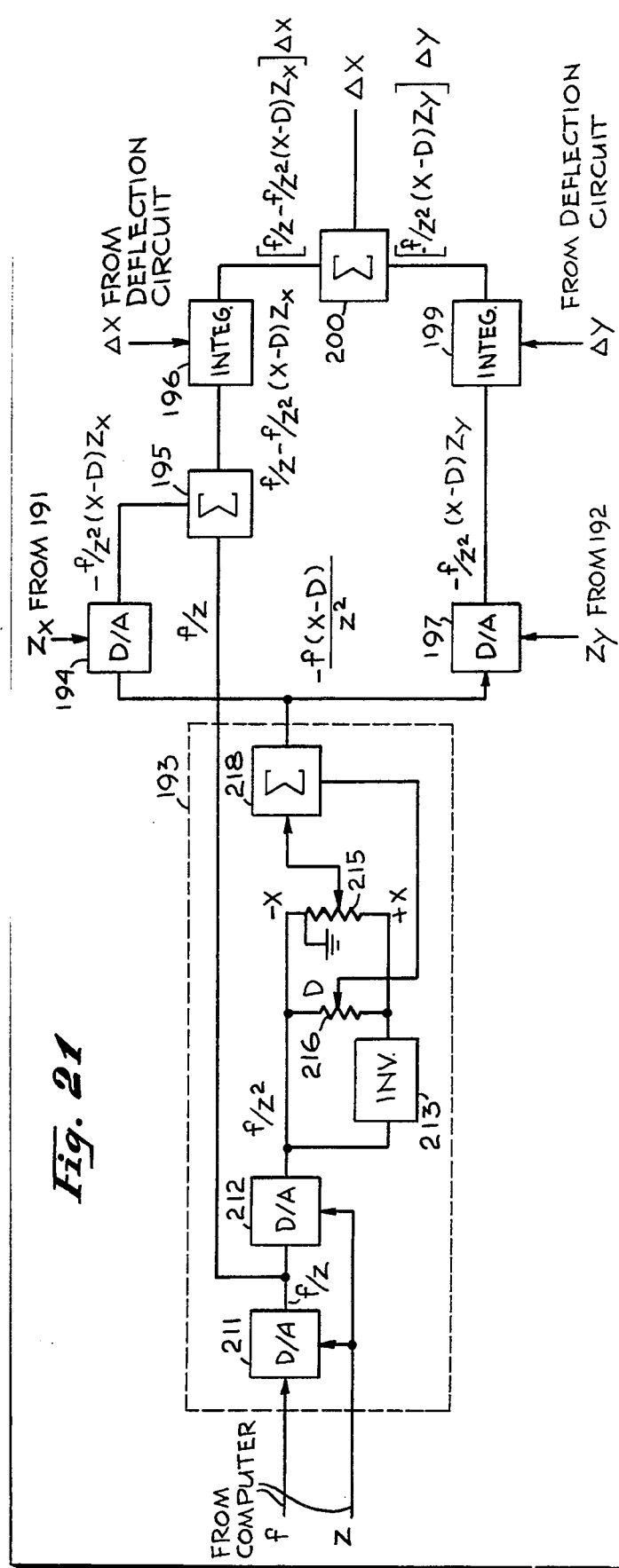
Figure 22B:
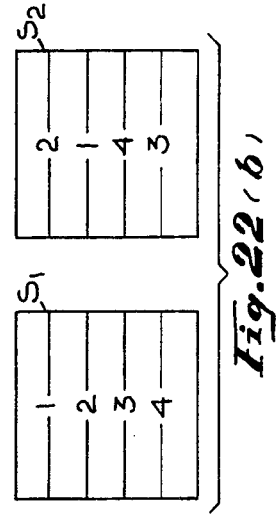
Figure 22A:
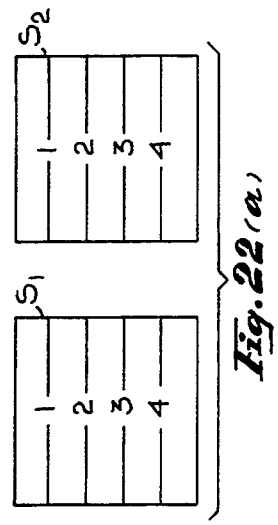
Figure 26:
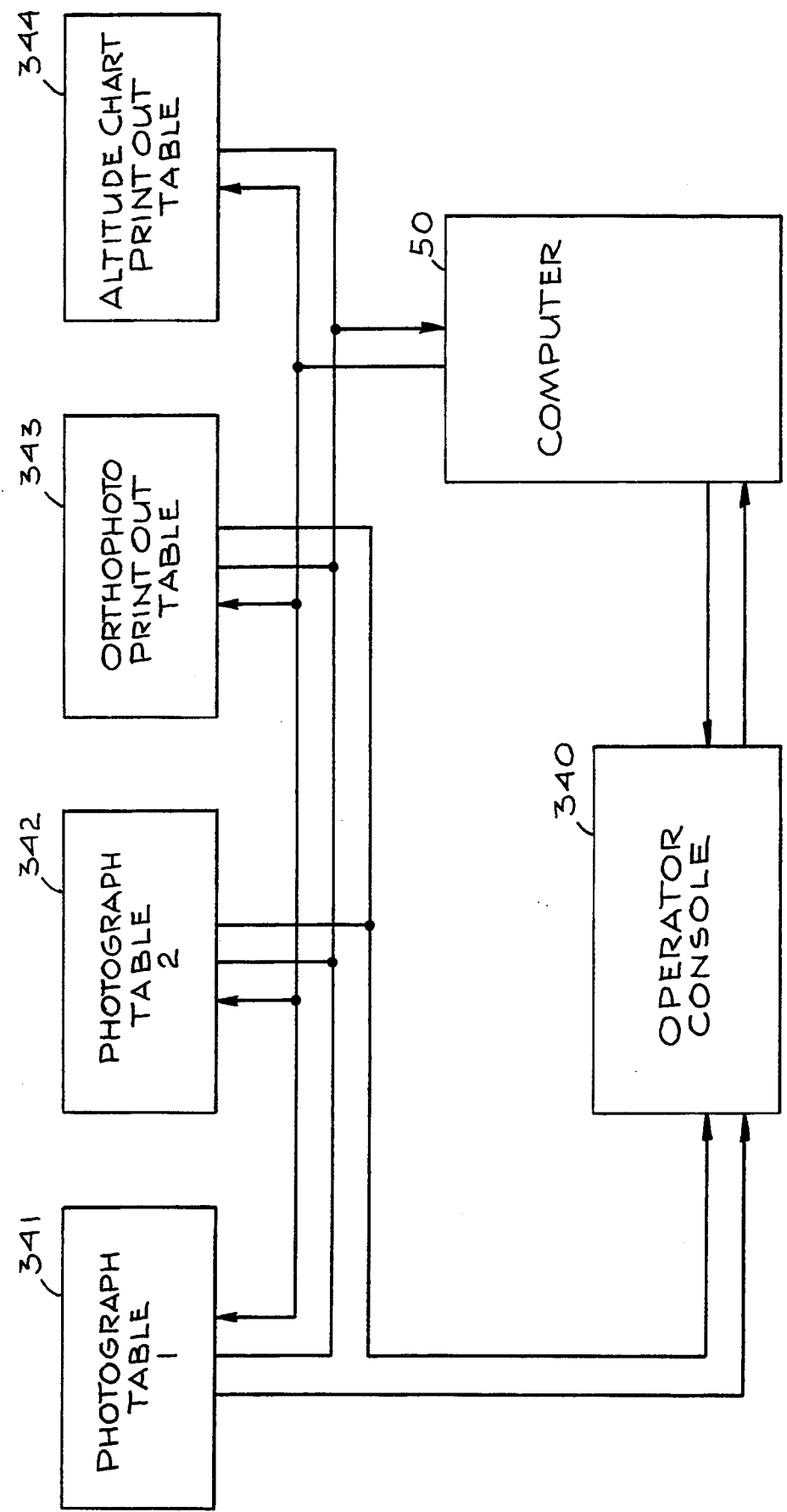

FIGS. 3(*a*), 3(*b*) and 3(*c*) represent simplified waveforms useful in explaining some of the principles of the present invention;

FIG. 4 is a simplified block diagram of one particular arrangement in accordance with the invention;

FIG. 5 is a representation of an orthophoto produced by the system of the present invention;

FIG. 6 is a representation of an altitude chart produced by the system of the present invention;

FIGS. 7(*a*) through 7(*f*) are representations of six different scanning patterns provided in the system of the present inventions;

FIG. 8 is a partial block diagram of the system of the present invention, useful in explaining one embodiment of Height Error Sensing Circuitry;

FIG. 9 is a schematic diagram of a correlator incorporated in the system of the invention;

FIG. 10 is a partial block diagram of the system of the present invention, useful in explaining another embodiment of Height Error Sensing Circuitry;

FIG. 11 is a partial block diagram, useful in explaining still another embodiment of Height Error Sensing Circuitry;

FIG. 12 is a detail block diagram of a particular portion of the arrangement shown in FIG. 4;

FIG. 13 is a diagrammatic perspective view of structure included in the arrangement of FIG. 4;

FIG. 14 is a table illustrating the timing and operation of the computer during a single point loop cycle;

FIGS. 15(a) and 15(b) are block diagrams showing the arrangement of another embodiment of the present invention;

FIG. 16 is a partial block diagram of a particular portion of another embodiment of the present invention;

FIG. 17 is a combination block and schematic diagram illustrating the details of a portion of the arrangement shown in FIG. 15(b);

FIG. 18 is a block diagram of an arrangement included in still another embodiment of the present invention;

FIG. 19 is a block diagram useful in explaining the operation of a particular portion of the arrangement shown in FIG. 15(b);

FIG. 20 is a block diagram useful in explaining a particular portion of the block diagram shown in FIG. 19;

FIG. 21 is a combination block and schematic diagram useful in explaining a portion of the block diagram shown in FIG. 19;

FIGS. 22(a) and 22(b) are representations of scanning patterns useful in explaining principles of operation of another embodiment of the present invention;

FIGS. 23(a) through 23(e) are representations of 5 scanning patterns useful in explaining the principles of operation of still another embodiment of the present invention;

FIG. 24 is a block diagram useful in explaining the scanning patterns shown in FIG. 23;

FIG. 25 is a partial block diagram of an arrangement of another embodiment of the present invention; and FIG. 26 is another partial block diagram of an arrangement of still another embodiment of the present invention.

Before beginning with the detailed description of the present invention, it is expedient to describe briefly, by way of introduction the principles involved in developing height information by automatically analyzing a pair of stereoscopic aerial photographs.

Stereo pairs of aerial photographs for mapping purposes are frequently made using an essentially vertical aerial camera. The two pictures of each pair are taken at a predetermined spacing along a line of flight which spacing i s a compromise between maximum overlap coverage and the wide stereo base desirable for altitude measurements. The geometry of an idealized stereo system: in which the camera is exactly vertical during two exposures and in which the nadir points of the photographs lie on a straight line which is substantially parallel to the line of flight, is shown in FIG. 1. It is convenient to describe the system of the present invention first as it would be used with such idealized photography after which the considerations required to adapt the system to more general situations which may actually be encountered will be discussed.

In FIG. 1 a diagrammatic representation of idealized camera geometry is shown including two camera position $C_1$ and $C_2$ and an incremental ground area generally designated by a point P with coordinates X, Y, and Z, the X coordinate being parallel to the line of flight while the Z coordinate represents the distance of the terrain image below the airplane. In the two camera positions the letter L designates the lens of a focal length f of the aerial camera while $D_1$ and $D_2$ represent the two photographs taken at the stations $C_1$ and $C_2$, respectively. The images of the point P on the two photographs are indicated by $P_1$ and $P_2$ having film plane coordinates $x_1$, $y_1$, and $x_2$, $y_2$, respectively.

Assuming that in determining the elevation of the area P a height of Z has been estimated. The system, on the basis of the estimated height, will first select and then cause the selected incremental areas having coordinates $x_1$, $y_1$, and $x_2$, $y_2$ on the photographs $D_1$ and $D_2$, respectively, to be synchronously scanned, as will be described later in more detail. Since the two synchronously scanned incremental areas at $P_1$ and $P_2$ have the same images, both corresponding to the terrain area P, the two images when correlated will indicate a very high degree of correlation.

However, suppose that the height of area P was estimated to be above its true position as at $P_e$, the system will cause the photographs $D_1$ and $D_2$ to be scanned centered about the incremental areas $P_3$ and $P_4$. It is apparent from FIG. 1 that the image of the terrain area P in the photograph $D_1$ namely the incremental image $P_1$ will appear to the right of the center of scan about point $P_3$, while area $P_2$ representing the image of terrain area P on $D_2$ will appear to the left of the center of the scan about point $P_4$, resulting in a lower degree of scanned imagery correlation, which in turn indicates an error in the estimated height of the terrain area P.

A simplified arrangement for deriving signals corresponding to errors in altitude estimates of terrain areas represented in photographs is shown in FIG. 2, wherein scanning apparatus $S_1$ and $S_2$ (with associated deflection circuits and lens systems not shown) direct light beams in a selected scanning pattern at predetermined incremental areas $P_1$ and $P_2$ on photographs $D_1$ and $D_2$, respectively. Areas $P_1$ and $P_2$ are calculated to represent corresponding imagery of a terrain area P having an estimated altitude $Z_e$ as shown in FIG. 1. The light beams of the scanners $S_1$ and $S_2$. are modulated by the photographic details of areas $P_1$ and $P_2$ and are detected by photomultipliers 41 and 42, respectively. The outputs of the two photomultipliers are then compared to detect the relative position of corresponding imagery in the two signals. In general, the respective photomultiplier signals do not have identical form. However, corresponding imagery in the two photographs will modulate the scanning beams in similar fashion so that its presence may be detected in the modulated photomultipliers' signals. For explanatory purposes, FIG. 3(a) shows well defined peaks in the output signals of the photomultipliers, such as might be produced by a bright point in the field. The peaks have zero time displacement therebetween, thus representing zero error in estimating the altitude of the point of the corresponding imagery. FIG. 3(b) shows the signals resulting from an error in estimated altitude as diagrammed in FIG. 1 wherein the signal corresponding to the imagery on photograph $D_1$ appears to the right of the center of the scan (assuming that scanning moves from left to right, as seen in FIG. 1), while the imagery in photograph $D_2$ appears to the left of center of the scan. An error in estimated altitude of opposite direction is represented by output signals of the photomultipliers 41 and 42 as shown in FIG. 3(c).

In brief, it maybe stated that the system uses a combination of digital and analog techniques associated with analog optical electronic scanners to change the relative positions of the scanned incremental areas with respect to each other so as to achieve the desired time difference correction, and the amount of relative displacement which is needed for such correction is utilized to provide the desired elevation correction indication. Most of the digital techniques are incorporated in a digital computer which performs the calculations relating the terrain coordinates to the two dimensional coordinates of the aerial photographs. The various parameters used in such calculations may better be under stood by referring again to FIG. 1. From the interrelationship of corresponding elements of similar triangles, the following equations are obtained:

$$\frac{x_1}{f} = \frac{X}{Z} \text{ which becomes } x_1 = \frac{fX}{Z} \quad (1)$$

and $$\frac{x_2}{f} = \frac{X-B}{Z} \text{ which yields: } x_2 = \frac{f}{Z}(X-B). \quad (2)$$

Similar expressions for $Y_1$ and $Y_2$ can be derived from a diagram viewing the system in a direction parallel to the line of flight. Since the photographs $D_1$ and $D_2$, are in line when viewed in this direction:. $y_1$ equals $y_2$ and the equation of proportionality can be written:

$$\frac{y}{f} = \frac{Y}{Z} \text{ which yields: } y = \frac{fY}{Z} \quad (3)$$

It is obvious from the above equations that if the coordinates of $P_1$, $P_2$, $x_1$, $y_1$ and $x_2$, $Y_2$, respectively, are known for a given point, it is possible to solve for the corresponding ground coordinates X, Y, Z. For the purposes of the system, it is actually more convenient to assume a position (X, Y); this makes $(x_1, y_1)$ and $(x_2, y_2)$ functions of Z, which can be determined by identifying the points $P_1$ and $P_2$ that satisfy the above equations (1): (2), and (3) and have correlating images. Thus, once the system is set up with a particular starting point established in ground coordinates, scanning can proceed on an automatic basis with X and Y progressing in a defined manner and Z being followed by feedback from the analog scanning with the corresponding values of the $x_1$, $y_1$ and $x_2$, $y_2$ relationships being determined by successive solutions of the above equations by the digital computer. As scanning proceeds, extrapolation from altitude measurements at near by points yields a probable altitude for the next point in line. A scan at the predicted position then corrects the estimated value.

The idealized geometry discussed in connection with FIG. 1 is not realized in practice. If there is any wind, the aircraft taking the photographs will "crab" along its flight path, resulting in a "swing" error on the photographs due to the fact that the camera axis does not line up with the line of flight. In addition, flight dynamics makes achievement of a stable platform quite difficult; most photographs are made with a certain amount of camera tilt, and it is quite possible that the two photographs of a stereo pair may have been taken from a slightly different altitude. Problems of this type are discussed extensively in a book entitled "Manual of Photogrammetry", 2d edition 1952 published by the American Society of Photogrammetry, and in particular in Chapter 6 on "Basic Mathematics of Photogrammetry". In the operation of the system of the invention, it is necessary to relate the ground coordinates X, Y, and Z to the film coordinates x, y. As discussed in the cited text, at page 368ff, the coordinates of the point in the photo system may be computed from the given coordinates of the same point in the terrain system through the expansion of the following matrix:

|   | x | y | z |
|---|---|---|---|
| X | $u_1$ | $v_1$ | $w_1$ |
| Y | $u_2$ | $v_2$ | $w_2$ |
| Z | $u_3$ | $v_3$ | $w_3$ |

The various parameters u, v, w are the direction cosines of the respective photograph system coordinate axes in the ground system of coordinates and may be further defined as set forth in the table designated (10.26) on page 368 of the above-mentioned text as trigonometric functions of tilt, swing and azimuth. The trigonometric terms are all constants for a particular photograph so that the equations become simple, once the appropriate numerical values are introduced. In accordance with the mathematical development above, the digital computer of the system of the invention is programmed to calculate photograph positions x, y corresponding to particular functions of the ground positions X, Y, Z. These may be considered as the transformation functions of the system and in general form may be represented as $$x = G(X, Y, Z) \quad (4)$$

$$y = H(X, Y, Z) \text{tm} \quad (5)$$

It will be understood that the equations (4) and (5) are unique for each photograph so that the computer must solve the two equations twice, once for each photograph. The machine coordinates are appropriate scalings of the plane terrain coordinates X, Y. As will be explained in further detail, the computer develops the value of the height coordinate Z during the operation of the system.

It should be mentioned that in addition to the above trignometric functions, which are related to the attitudes of the cameras as the photographs are taken and which are included in the coefficients of the particular transformation functions as represented by equations (4) and (5), the coefficients are modified in accordance with the error involved in placing the photographs on the compilation marriage, in order that the appropriate transformation may be properly related to the actual position of the photographs in the system. This modification is performed at the time of setting up the computer for a given set of photographs preparatory to automatic operation of the system, and the corresponding information is automatically fed into the computer during the manual setup procedure.

A simplified block diagram of one particular embodiment of the present invention is shown in FIG. 4, in which an automatic map compilation system is shown including a movable compilation table 40 on which the photographs $D_1$ and $D_2$ are positioned, together with an orthophoto film sheet $N_1$ and an altitude chart film sheet $N_2$. Both photographs are scanned and the resulting signals analyzed to determine the altitude of the corresponding terrain. The orthophoto film sheet $N_1$ is provided for producing an orthographic photo map, and the film sheet $N_2$ is provided for the production of an altitude chart. A mechanical drive mechanism 44 is connected to the table 40 in order to move it in a precise profiling pattern in both the x and y directions. The profiling pattern, as distinguished from scanning, proceeds in alternating y directions with step-over in the x direction by a predetermined incremental distance at the end of each y traverse. A pair of photomultiplier tubes 41 and 42, associated with the respective photographs $D_1$ and $D_2$, are affixed near the table 40 so as to be in position to collect the light beams as modulated by passing through the photographs.

The x and y positions of the compilation table 40 are reported to a computer 50 by means of a position readout stage 45. From the information thus reported, the computer further controls the relative positions of lenses 46 and 47, by means of x servos 48 and 49 and y servos 52 and 53 through digital-to-analog (D/A) converters 56, 57, 58 and 59, respectively. In this fashion the light beams are centered on the appropriate computer commanded incremental areas of the respective photographs for scanning. The light sources for scanning the respective photographs are a pair of flying spot scanners 61 and or similar light sources easily adaptable to electronic scanning and switching techniques. The flying spot scanners provide intense, small spots of light of very short persistence that move back and forth in a TV-like scan, with the fast scan in the x direction on the respective photographs, to convert the photographic imagery to electrical signals, Thus, scanning proceeds basically over incremental line elements in the x direction while profiling occurs with the movement of the table 40 in the y direction. Cathode ray tubes 63 and 64 are provided for printing out the respective orthophoto and the altitude chart on the two film sheets $N_1$ and $N_2$. Deflection circuits for the flying spot scanner 61, 62 and for the cathode ray tubes 63, 64 are designated 66, 67, 68 and 69, respectively. Each of the deflection circuits 66–68, together with other circuitry described hereafter, causes the associated tube to generate an appropriate raster, which may be defined as a predetermined pattern of scanning providing substantially uniform coverage a predetermined area. The deflection circuit 69 is arranged to maintain the image of the raster formed by the electron beam of the tube 64 in a substantially fixed position on the photograph during a height evaluation. A sync pulse generator 71 for generating x and y sync pulses necessary for the scanning operation and the print out of the orthophoto film sheet: is coupled to each of the deflection circuits 66–68.

The computer 50 and a computer terrain tilt simulator 72, which may be regarded as a special subsystem, control a raster shape modulator 75 which generates sweep signals and supplies them to the deflection circuits 66 and 67 of the flying spot scanners. The signals from the raster shape modulator adjust the shape and size of the scanning rasters of the two scanners so as to compensate for terrain tilt and altitude variations. The output signals from the photomultipliers 41 and 42, which correspond to the light beams of scanners 61 and 62 modulated by the image detail in the scanned portions of photographs $D_1$ and $D_2$, are applied to a height error sensing circuit 76. The error sensing circuit 76 employs correlation techniques to measure altitude errors and supplies signals to the computer 50 through counter 77, so that appropriate height corrections may be made in the previously estimated altitude value of the particular area which is being scanned. The error sensing circuit 76 also supplies through counter 77 and a converter 78 a height error signal to the deflection circuits 66 and 67 causing a relative displacement between the centers of the two scanning rasters thereby varying the incremental areas on 30 the photographs which are synchronously scanned, until a degree of signal coincidence similar to that shown in FIG. 3(a) (indicating zero height error) is approached. The output signals from the photomultipliers 41 and 42 are also supplied to a selector circuit 81, which selects the signal from one of the photomultipliers and supplies it to the orthophoto tube 63 for exposing film sheet $N_I$ so as to print an orthographic projection of the incremental area scanned thereon. Such selection may be manually accomplished by selecting either of the signals, or electronic techniques may be employed to select the better of the two video signals from the two photomultipliers.

As previously explained the output film sheets $N_1$ and $N_2$ are mounted on the compilation table 40 so as to follow the motion of the photographs $D_1$ and $D_2$, and be exposed in accordance with information derived during the scanning operation of the system. The cathode ray tube 63, associated with the orthophoto film sheet $N_1$, is controlled to reproduce in a TV-like manner terrain character information received from a selected photomultiplier 41 or 42 while the cathode ray tube 64, associated with the altitude chart film sheet $N_2$, is controlled by the computer 50 to produce height information. These two cathode ray tubes provide the means by which the output data is printed out on the photosensitive sheets, thereby producing an orthophoto and an altitude chart. The orthophoto cathode ray tube 63 receives its signal from the selector 81 as an input to its intensity control grid so that the electron beam of the tube 63 is appropriately modulated with the terrain information. The imaging optics, represented by the lens 83, focuses this image on the sensitized film sheet $N_1$. An orthophoto is exposed on the film as the compilation table 40 moves in a profiling pattern about the stereo field, causing diapositives $D_1$ and $D_2$ to be incrementally scanned by flying spot scanners 61 and 62 and the image detail transferred to appropriate portions on the film sheet $N_1$. The other cathode ray tube 64 receives its intensity grid modulating signal from the computer 50 during the automatic scanning 30 mode of operation. The cathode ray tube 64 through a focusing lens 84 traces out only a line on the altitude chart film sheet $N_2$ as the compilation table 40 proceeds in its y profiling direction.

A typical orthophoto is represented in FIG. 5. As shown, the orthophoto is printed, profile by profile, as the film sheet $N_1$ is moved back and forth under the cathode ray tube 63 to reproduce the detail appearing in the aerial photographs. FIG. 6 represents a corresponding altitude chart printed out on the film sheet $N_2$ by the cathode ray tube 64. It will be noted that the altitude chart is printed in three distinct shades, in this case black, gray and white. Each shade indicates a different elevation range as selected by the operator in setting the scale of the map (for example. 1240–1260 feet) and the three shades follow in repetitive sequence for a monotonic change of elevation. By using this manner of displaying elevation information, the direction of change of elevation is indicated in addition to the fact that a change occurs at a particular point. Thus, a change from black to gray may mean that the elevation has changed from the range of 1240–1260 feet to the next lower: range, 1220–1240 feet), whereas a change from the same black region to white would indicate that the elevation has changed from the range 1240–1260 feet to a higher range above 1260 feet. It is thus a simple matter to determine the usual contour lines by connecting the respective corresponding points of changes in elevation, as indicated on the altitude chart of FIG. 6.

The manner in which scanning of a particular incremental area proceeds may be described by referring to FIG. 7 comprising patterns 7(a)–7(f). In FIG. 7(a), the scanning pattern for one flying spot scanner is represented. The electrical signals produced by each of the photomultipliers 41 and 42 during a single complete scan are suitably gated so as to develop the five effective scan patterns which are respectively designated 7(b), 7(c), 7(d), 7(e) and 7(f). Corresponding signals from each of the two photomultipliers 41 and 42 for each of the respective scan segments are correlated in order to produce height error signals for each segment. The central area signal, corresponding to the scan segment 7(b), develops the height error signal for application to the computer 50 in order to correct previously approximated elevation values for the particular scanned areas. The left and right segment signals, corresponding to the patterns 7(c) and 7(d), appropriately summed may yield an x-axis tilt error signal, while the top and bottom segment signals, corresponding to patterns 7(e) and 7(f), appropriately summed may yield a y-axis tilt error signal. When correlation between respective signals is poor over the central area, the signals from all five segments of the patterns shown in FIGS. 7(b)–7(f) can be combined to provide a more satisfactory height error signal. The flit error signals may be utilized in the raster shape modulator 75 which as previously explained skews the shapes of the scanning rasters so as to account for slope variations of the areas under investigation. Typically, the raster will take the form of a parallelogram (FIG. 7(c)) obtained by a proper summation of fast and slow sweep components applied to the sweep axes of the scanning circuitry. The signals may also be fed to the computer 50 to permit accurate extrapolation of the next altitude value:, thus substantially reducing the height error requiring correction in the next measurement cycle.

Tilt error signals may also be derived from the computer wherein terrain tilt components may be computed on the basis of elevation variations of neighboring points previously calculated in the compilation operation.

Figure 7A:
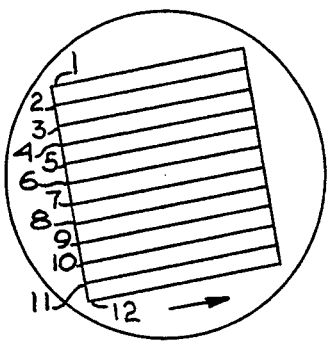
Figure 7B:
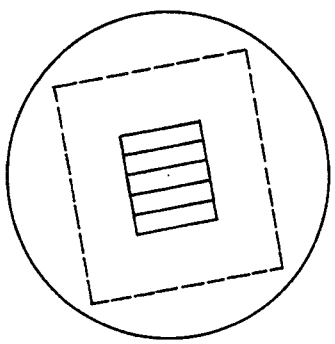

In one embodiment of the present invention a correlator circuit 90 as shown in FIG. 8 is employed in the error sensing circuit 76 (FIG. 4) for providing height error signals by correlating signals corresponding to scanning patterns similar to FIG. 7(b). The output signals of the photomultipliers 41 and 42, which are functions of the intensities of the light beams as modulated by the photographs $D_1$ and $D_2$, are used as input signals to video amplifiers 85 and 86 which are respectively connected to automatic gain controlled amplifiers (AGC) 87 and 88. The outputs of the amplifiers energize a pair of correlators 91 and 92 through delay stages 93 and 94. For each correlator 91 or 92, one input is applied directly from one photomultiplier (through a corresponding video amplifier and an automatic gain controlled amplifier) while the other input is applied from the other photomultiplier through a corresponding delay stage 93 or 94. An input error signal derived from a difference amplifier 95 energized by the outputs of the correlators 91 and 92, by comparing the respective outputs of the correlators against each other so that the resultant signal is a measure of the discrepancy between the two correlator outputs. Because of the delay interposed in one of the inputs by the delay stage 93 or 94, the correlation between the delayed signal and the undelayed signal is either improved or made worse, depending upon whether or not the time displacement of the photomultiplier signals is compensated by the delay. The time displaced signals, such as those shown in simplified form in FIGS. 3(b) and 3(c), are thus brought into better correlation in one of the correlators while the correlation is diminished in the other correlator. As a result, the output of one correlator, such as 91, increases while the output of the other correlator, such as 92, decreases. The difference between the two as derived in the difference amplifier 95 provides an error signal of a particular polarity and having a magnitude indicative of height error. If on the other hand the signals are coincident in time, indicating the estimated altitude to be correct, the correlation in each of the correlators 91, 92 is off by the amount of delay introduced at the input thereof. The outputs of the correlators 91 and 92 are thus the same so that the resultant error signal, equal to their difference, is zero. As explained in connection with FIGS. 3(a) through 3(c), the height error signal is thereby a function of the magnitude and direction of deviation from true elevation. The output of the correlator circuitry 90 is supplied to an integrator 99 of an analog error detector designated generally by numeral 101. The output of the integrator 99 is applied to each of two Schmitt trigger circuits 102 and 103, one intended to sense positive error signals and the other to sense negative error signals. As is well known, the Schmitt trigger circuit changes state when the input signal passes across a predetermined threshold level. As the cumulative height error, integrated in the integrator 99 from the correlator output, reaches this predetermined level, the appropriate Schmitt trigger is energized, causing a pulse to be applied to the reversible binary counter 77, which serves as an analog-to-digital converter. At the same time the output of the energized Schmitt trigger serves to reset the integrator 99. The output of the reversible counter 77 is connected through a digital-to-analog converter 78 to the deflection circuits 66 and 67 in order to relatively displace the scanned incremental areas so that after a number of successive steps the correlated signals are made to be coincident in time. The reversible counter is also connected to the computer 50, which at a predetermined point in the programming cycle reads the counter as an error in estimated height of the scanned area, and makes appropriate modifications of the altitude value stored therein. The computer also resets both the counter 77 and the integrator 99 so that height error evaluations of the next incremental areas to be scanned may proceed independently of the last measurement.

A schematic diagram of a correlator such as may be used in correlators 91 and 92, is shown in FIG. 9. This correlator is of the multiplying type and comprises a plurality of resistors 105, diodes 106, and a capacitor 107 interconnected across the secondary windings of pair of transformers 108 and 109, arranged to receive as inputs the signals A and B which are to be correlated. The diodes 106 have their polarities as shown with adjacent pairs of diodes poled in opposite directions. The diodes 106, together with the resistance 105, provide an approximation to a square law voltage-current relationship. The push-pull transformers 108 and 109 are used to make available both polarities of the two input signals, A and B. The output voltage $e_o$ across the capacitor 107 may be written:

$$e_o = \frac{K}{RC} \int_0^T [(A+B)^2 - (A-B)^2]dt \quad (6)$$

where K is an arbitrary constant of proportionality, R is the resistance of one of the resistors 105 and C is the capacitance of the capacitor 107. Depending on whether the sums of A+B and A−B are positive or negative, different ones of the diodes 106 will be rendered conducting in order to transfer charge to or from the capacitor 107. The above equation simplifies to:

$$e_o = \frac{4K}{RC} \int_0^T AB\, dt \quad (7)$$

so that the output voltage $e_o$ is a measure of the average product of the two signals A and B, and; hence, indicates the degree of correlation between them. For example, if A and B are signals having random characteristics, the product will have many positive and negative contributions and, hence, a low average; whereas if A and B are identical, the instantaneous products are always positive and, hence, form a non-cancelling sequence. The desired integral represented by equation (7) is only approximated with the simple circuits shown in FIG. 9, but the depicted circuit is quite effective as a means for signal correlation.

Referring again to FIG. 8 wherein height sensing circuitry is shown, it seems apparent that the complete frequency spectrums of the signals from photomultipliers 41 and 42 are used in correlator circuit 90 for deriving the height error signals, thereby taking advantage of all the information in the imagery in the two photographs. However, experience has shown that in some cases it may be desirable to derive the height error signal from a combination of signals representing predetermined degrees of image detail. Such combinations permit very close following of the terrain altitude variations over relatively smooth surfaces with a minimum tendency of the system to "get lost" in terrain of greatly varying altitudes.

Therefore, in another embodiment of the present invention a height sensing circuit as shown in FIG. 10 is incorporated wherein different imagery spectrums are combined. The correlator circuit 90 shown therein, which is energized by signals from amplifiers 87 and 88 operates in a manner identical to the one described in connection with FIG. 9. However, as shown in FIG. 10, the outputs of video amplifiers 85 and 86 are also supplied to a filter unit 111 wherein predetermined high frequencies are filtered out before supplying the signals to automatic gain controlled amplifiers 87' and 88' which energize a correlator circuit 90' identical in function and performance to correlator circuit 90. The outputs of correlator circuits 90 and 90' are then supplied to a summing integrator 99a similar to integrator 99 of FIG. 8 except that summing integrator 99a integrates the combined input signals from correlator circuits 90 and 90'. The rest of the height sensing circuitry is identical to the circuitry shown in FIG. 8 and therefore its description will not be repeated.

In the above described embodiments of the height sensing circuitry (FIGS. 8 and 10), the digital height error signal from the counter 77 is converted in the D/A converter 78 to an analog signal used to relatively displace the rasters of the scanners 61 and 62 (FIG. 4) by supplying appropriate signals to their respective deflection circuits 66 and 67. As explained herebefore, by relatively displacing the rasters with respect to one another, the positions of the corresponding imagery in the two scans are made to vary, so that homologous areas on both photographs are synchronously scanned. The same desired result may be achieved by differentially delaying the output signals of the photomultipliers 41 and 42 so that the apparent positions of the corresponding imagery in the two scans seems to be the same. The magnitude of such differential delay would then indicate the true positions of the imageries within their scans which is the desired indication of the error in estimated height.

FIG. 11 partially represents a height sensing circuit wherein such differential delay techniques are incorporated. The outputs of video amplifiers 85 and 86 energize a differential delay unit 112. The unit may be described as comprising independent delay lines which, depending upon the instructions from the delay selection logic lines, may insert a delay in one line or the other depending on the polarity of the count in the counter 77, with the magnitude of the delay being dependent on the magnitude of the count in the counter 77. The remainder of the height sensing circuitry is identical to the circuitry shown in FIG. 10.

As previously stated, the photographs $D_1$ and $D_2$ are scanned in a pattern defined by the shape of the scanning raster which is controlled by the raster shape modulator 75, wherein the slope components of the scanned terrain are accounted for. The need to modify the shape of the rasters of the flying spot scanners 61 and 62 in order to compensate for the terrain's slope components may be better understood from a consideration of the above-mentioned transformation functions (4) and (5) which are reproduced below for convenience:

$$x = G(X, Y, z) \quad (4)$$

$$y = H(X, Y, Z)\text{tm} \quad (5)$$

The transformation functions relate the Cartesian coordinates of the flying spot scanner rasters as they appear on the respective photographs to the ground coordinates X, Y, Z.

Let it be assumed that the computer is considering a point on the terrain having coordinates X, Y, Z, and the scan on the first photograph will be centered at (x, y) as given by the functions G, H defined in equations (4) and (5). As the scan on the orthophoto: moves from X, Y to X+ΔX, Y+ΔY, the scan on the photographs should be moved accordingly so that the instantaneous point under observation agrees with the point being printed out by the orthophoto tube. The relationship of the incremental scans may be defined by $$\Delta x = G_x \Delta X + G_y \Delta Y + G_z \Delta Z \quad (8)$$

However, $\Delta Z$ is a function of height error related to $\Delta X$ and $\Delta Y$ as modified by the terrain slope and may be represented as $$\Delta Z = Z_X \Delta X + Z_Y \Delta Y \qquad (9)$$

combining equations (8) and (9) yields:

$$\Delta x = [G_X + G_Z X Z_X] \Delta X + [G_Y + G_Z Z_Y] \Delta Y \qquad (10)$$

The function (5) may similarly be expanded yielding $$\Delta y = [H_X + H_Z Z_X] \Delta X + [H_Y + H_Z Z_Y] \Delta Y \qquad (11)$$

The functions corresponding to the second photograph may be expanded in a similar manner.

From a careful observation of the functions (10) and (11), it is seen that both the x and y scan components of the photograph scanner include both fast ($\Delta X$) and slow ($\Delta Y$) scanning components of the orthophoto. Further, the photograph scanning pattern is a function $Z_X$ and $Z_y$ which are the terrain slope components in the direction of the line of flight and in a perpendicular direction thereto, resulting in the photographs being scanned by a skewed raster pattern so that the instantaneous area under observation corresponds to the area printed out on the orthophoto film sheet $N_1$. As the height Z varies with the ground coordinates X; Y, the coefficients of the respective X and Y variables change accordingly, thus adjusting for the scaling and shaping of the flying spot scanner rasters in order to match the orthophoto scan for the different terrain involved. With vertical photography and level terrain, the shape of the photograph raster is identical with the orthophoto raster. When the terrain slopes, however, the photograph raster becomes parallelogram-shaped to match the square orthophoto raster:.

As previously noted, the skewing of the scanning raster improves the correlation and the quality of the orthophoto. However in some situations the results may be adequate without incorporation of this function.

FIG. 12 represents one embodiment of a raster shape modulator arranged to correct for variations in altitude and for slopes in the direction of the scan for essentially vertical photography. This configuration would be used with a raster that is wide in the x direction thus providing more time in each line scan for correlation but narrow in the perpendicular (y) direction to simplify the shaping requirements It would therefore permit a wide separation between successive profiles thus speeding up the compilation process. The extension to a raster shape modulator that corrects for slopes in both directions and therefore permits still greater compilation speeds follows in an obvious manner from the simplified version.

The raster shape modulator shown is implemented in accordance with equations (10) and (11) wherein Z is arbitrarily made equal to zero, i.e.

$$\Delta x = (G_X + G_Z Z_X) \Delta X + G_Y \Delta Y \qquad (12)$$

and $$\Delta Y = H_X \Delta X + (H_Y + H_Z Z_Y) \Delta Y \qquad (13)$$

For vertical photography where $$G = \frac{fX}{Z} \qquad (14)$$

and $$H = \frac{fY}{Z} \qquad (15)$$

as derived from equations (1) and (3). The scan equations (12) and (13) become $$\Delta x = \left( \frac{f}{Z} - \frac{fX}{Z^2} Z_X \right) \Delta X \qquad (16)$$

and $$\Delta y = \frac{f}{Z} \Delta Y - \frac{fY}{Z^2} Z_X \Delta X \qquad (17)$$

FIG. 12 shows a Z register 115 obtaining the local altitude from the computer 50. This operates through a D/A converter 116 to perform the operation f/Z wherein f is applied as a fixed voltage input to D/A converter 116. The output of the D/A converter 116 is applied to a second D/A converter 118 which also operates from the Z register 115 so that its output is $f/Z^2$. This output is applied to a third D/A converter 119 which operates from a register 120 holding the X-axis slope component $Z_X$ supplied thereto from the computer 50. The output of the D/A converter 119 is therefore $fZ_X/Z^2$ and its complementary output $-fZ_X/Z_2$ is also made available. These two outputs are applied across a potentiometer 122 linked to the X motion of the carriage 40 so that it multiplies the input by X providing the term $-fZ_X X/Z^2$. The two terms f/Z and $-fZ_X X/Z^2$ from the D/A converter 116 and the potentiometer 122 respectively are appropriately summed in a fast integrator 125 whose output is made zero at the line sync time supplied thereto from the sync pulse generator 71 (FIG. 4), The output of the fast integrator 125 provides the function $\Delta x$ indicated by equation (16) and is supplied to the X-axis of the deflection circuits 66 and 67 (FIG. 4) . The two voltages $+fZ_X/Z^2$ from the D/A converter 119 are also supplied to a potentiometer 123 linked to the Y motion of the movable table 40 which then provides the output $-fZ_X Y/Z^2$; this signal is applied to a fast integrator 126 whose output is made zero at the line sync time supplied thereto from the sync pulse generator 71. The output of the D/A converter 116 which is f/Z is supplied to a slow integrator 128 which is synchronized by a frame sync pulse from the sync pulse generator 71, so that the output of slow integrator 128 equals $f/Z \Delta Y$. The outputs from the fast integrator 126 and the slow integrator 128 are summed up in an adder circuit 129, the output thereof being the function $\Delta y$ indicated by equation (17) and supplied to the Y-axis of the deflection circuits 66 and 67.

The flying spot scanner driving circuitry, comprising the deflection circuits 66, 67, the sync pulse generator 71 and the raster shape modulator 75 (FIG. 4), generates one of three rasters for use at each flying spot scanner. A three-inch by three-inch raster is used to provide a relatively large scanned area for a stereo viewer 82 (resulting in an area of 200 mils by 200 mils on the photographs) for use during a manual setup procedure. The 1.5-inch by 1.5-inch raster also is useful during the setup operation in that it provides a smaller area (100 mils by 100 mils) scan and hence a magnified image on the stereo viewer 82. The actual size of the image observed is the same for both raster configurations. In the automatic mode, a nominal ¾-inch by ¾-inch, 40-line, 120 cycle raster is generated by the electronic sweep circuitry. This raster size results in a scanned area of 50 mils by 50 mils on each photograph. The geometrical configuration of the raster when in the automatic mode is determined by the raster shape modulator 75. The light beams from the flying spot scanners 61 and 62, as modulated by the associated photographs $D_1$ and $D_2$, are sensed by the photomultipliers 41 and 42. The resulting electrical signals are used to recreate the imagery for the orthophoto production, for direct viewing at the stereo viewer, and for use in the height sensing circuitry.

In one embodiment of the present invention, the compilation table 40 is mounted as shown in FIG. 13 on a pair of carriages 131 and 132 controlled to provide the desired traverse motion of the table 40. The Y carriage 131 is mounted on roller bearing blocks riding on an inverted "V" groove-way which serves to support the relatively heavy Y carriage with a minimum of undesirable sideplay. The Y carriage is driven by a high precision ball-nut lead screw 134 using preloading in the ball-nut to eliminate back lash. A 400 cycle, two-phase servomotor 135 is coupled to supply driving power for the Y carriage 131. With this arrangement, the Y carriage 131 moves smoothly with its position reported to the computer 50 by a two-bit gray code shaft-to-digital encoder 136.

In the traverse movement of the compilation table 40, it is expedient to move the X carriage 132 in a precision step-by-step manner, thereby minimizing the problem of reporting its position to the computer 50. The X carriage 132 is supported by ball-bushings riding on hollow shafts which are mounted on the Y carriage 131. The X carriage 132 is connected to a drive servomotor (not shown) through a ball-nut lead screw 88 and antibacklash gears. A stepping motor is supplied to drive the X carriage 132 in increments of 0.01 inch. When more than one step is required, the motor continues to step until the desired position is reached. The number of steps taken is counted by the computer 50, thereby making the X carriage position known to the computer.

In the foregoing arrangement, the control of the position of the compilation table 40 is arranged to achieve satisfactory positioning accuracy. Control of the stepped position of the X carriage is accurate to a deviation of approximately 0.0002 inch. Despite the weight of the relatively heavy Y carriage, the control system is capable of stopping the carriage at the end of each profile traverse from a velocity of one inch per second in sixty milliseconds with a deceleration distance of approximately 0.035 inch. Since the position of the Y carriage is reported to the computer in digital code: and since the position of the X carriage is fixed with such precise accuracy, the system of the invention is able to make measurements at predetermined points which are within very close tolerances of the computer-defined values.

In order to produce the required relative displacement between the incremental areas selected for scanning on the respective photographs, the lens systems associated with the flying spot scanners 61 and 62 may be arranged to be movable under the control of the computer 50. The two lens systems are identical and provide a 16:1 reduction in image size of the photographs. Each system comprises a two axis, x and y, servo. A gear reduction drive is utilized including preloaded ball-nut lead screws to eliminate back/ash and provide precise positional control of the lenses. The orthogonality of the x and y axes and low side play on each axis are insured by using preloaded ball bearings rolling in V-groove-ways similar to the support mechanism for the compilation table Y carriage. The control circuitry consists of closed loop 400-cycle positioning servos, such as the servo 48 (FIG. 4), which are controlled by the computer through digital-to-analog converters. Precision potentiometers are used as position feed-back transducers to complete the feed-back loop.

In order to improve the accuracy and speed of response of the system, servo error signals may be applied to the deflection circuits 66 and 67 of the associated flying spot scanners 61 and 62 from the servo units 48 and 52, 49 and 53, respectively, in order to compensate for any instantaneous lens servo position error and especially for the servo inertia which limits the speed of response of the servo system to energizing signals. This error signal is arranged to deflect the raster of the flying spot scanner so that the scan will center on the desired area of the photograph, even though the lens is still being moved into position by its positioning servo. This arrangement produces a very fast effective response for the lens positioning system so that the automatic operation of the over-all system may proceed rapidly with high precision.

The system, according to one embodiment of the invention, examines geographical positions which are spaced in multiples of 0.01 inch at the orthophoto scale in the Y traverse direction, which is thus perpendicular to the flight line on the orthophoto. The corresponding positions on the two photographs will be spaced a like amount if the incremental area being scanned is at the selected reference altitude. The spacing may be greater for areas above reference altitude and less for areas below reference altitude because of corresponding changes in scale on the photographs.

The scanning operation is controlled in accordance with the broad outline for a computer program which is diagrammed in FIG. 14. The outline represented in FIG. 14 may be referred to as a point loop cycle, and represents a preset control sequence for the computer 50 during the analysis of an individual incremental area for one set of homologous points on the respective photographs. The cycle requires just over 15 milliseconds to complete for the particular computer 50 which is utilized in the described arrangement of the invention. During the point loop cycle, the gray code information derived from the Y position readout stage and the elevation change information derived from the error sensing stage are supplied to the computer. Utilizing information already stored in the computer from previously scanned homologous points, a new height is estimated for the next position to be scanned, the new photograph coordinates are calculated and the corresponding information is applied from the computer output to the appropriate portions of the system to achieve the desired centering on the photographs for the proper analysis of the new homologous points. The cycle is then completed and is repeated over and over again during the automatic scanning procedure, perhaps as many a 500,000 times for one set of photographs.

In the operation of the system of the invention as represented in FIG. 4, the automatic scanning of the photographs, the analysis of the derived information, and the printout of the orthophoto and the altitude chart proceed under the over-all control of the computer 50. Although any large fast computer with the proper input-output characteristics may suffice for this function, the system has been arranged to operate with a relatively inexpensive, digital computer since the complexity of the calculations to be performed therein is relatively low. When the system is being operated in the automatic mode of operation, the digital computer 50 is operated in accordance with a specified program, to calculate where the homologous points corresponding to a given geographical location and estimated altitude are to be found on the two diapositives. The various servos for driving the lenses 46, 47 are controlled by the computer output to move the electronic scanning to the areas on the diapositives which are calculated to be centered on the homologous points. Associated correlation circuitry in the error sensing circuit 76 then evaluates the relative displacement of the scanned areas and provides signals which are fed back to the computer to indicate the error in the estimated altitude. The error signal and resulting altitude are then used for making the next altitude estimate. The operation proceeds with the computer making the calculation for the next point in the sequence. As the operation progresses, the terrain character is printed out on the orthophoto film sheet $N_1$ and the altitude data is printed ont on the altitude chart film sheet $N_2$.

It is apparent from the above description of the operation of the present invention that the accuracy of the output information printed out on the two film sheets directly depends on the computer's calculations, the ability of the computer to position the analog system so that preselected incremental areas may be synchronously scanned, and the accuracy of correlating the modulated scanning signals.

One embodiment of the system incorporating some particular aspects of the present invention which greatly increase the over-all accuracy of the system may better be described by reference to a more detailed block diagram of the arrangement of FIG. 4, as is presented in FIGS. 15(a) and 15(b). In this more detailed block diagram, corresponding individual elements are designated by like reference numerals. The computer 50 is shown coupled to receive input information in the form of programmed instructions from input unit 140, presented, for example, on punched paper tape automatically read by a tape reader 141. The unit 140 further comprises a data writer 142, which may be in the form of a specially connected typewriter, used by the operator for special purposes in the various modes of the operation of the system. For example, in preparing the system for automatic scanning, a mode selector switch 145 comprising a plurality of movable contacts 145A–145F is first placed in the manual position. The manual mode of operation is provided for determining certain constants to be supplied to the computer for successful operation in the automatic mode. Alignment in the manual mode involves a fairly precise positioning of the photographs $D_1$, $D_2$ with reference to the computer controlled positioning mechanism for the compilation table 40. It will be understood that the respective photographs $D_1$ and $D_2$ will have particular points, referred to as passpoints, identified in each photograph with the photo and ground coordinates of the respective passpoints already determined and fed into the computer 50 from the tape reader 141. In order that the system may be prepared for operation in the automatic mode, it is necessary to provide certain photogrammetric parameters to the computer 50 by means of the data writer 142 and the paper tape 141. These parameters relate to the Cartesian coordinate positions of the cameras taking the respective photographs and of the respective passpoints on the photographs, to the correction of camera lens error, and to the elevation interval code information. After the photographs $D_1$ and $D_2$ are placed in position on the compilation table 40, the X and Y carriages and the associated lens systems are moved by the operator under the control of the computer 50 to the first selected passpoint. When the carriages have reached the proper location, the passpoint may be observed on a stereo viewer 82 which includes a display cathode ray tube and an accurately positioned electronically generated cross-hair for each photograph. The stereo viewer 82 is provided with duplicate magnified views of the respective incremental photograph areas including the particular passpoint being scanned, when the system is operating in the manual mode. By controlling the computer 50 via the data writer 142, the operator causes the system to properly align the first passpoint on each diapositive with the cross-hairs of the stereo viewer 82.

During this phase of the alignment process, the photo coordinates of the first passpoint previously fed into the computer 50 from tape reader 141 remain stored therein while additional coordinate information related to the first passpoint, as properly aligned with cross-hairs of the stereo views, is supplied to the computer by the compilation table position indicators. The operator then actuates the computer through data writer 142 to move the photographs to the position for scanning the second passpoint. The alignment process is then repeated so that the second passpoint becomes centered on the corresponding cross-hairs in the stereo viewer 82. The computer then receives additional coordinate information related to the actual position of the second passpoint in the system. On the basis of all the coordinate information relating to both passpoints as initially supplied to the computer by tape reader 141 and during the alignment process of both points, the computer updates and calculates new coefficients for the transformation equations of the computer program, which accurately relate the particular points in the field of the photographs to the machine coordinates of the compilation table 40. The operator then directs the system through the computer to scan a third passpoint in order to verify that the new coefficients of the transformation equation were accurately calculated. This is accomplished by observing the third passpoint on the photographs with reference to the cross-hairs of the stereo viewer 82. With the successful location of the third passpoint on each photograph, the system is placed in the automatic mode by properly switching the mode selector switch 145.

The alignment process described above greatly increases the accuracy of the system by eliminating the need for precisely adjusting the physical positions of the photographs on the compilation table, and by further updating all coordinate information after the photographs have actually been fixed within the system. The alignment process further serves to compensate for any drift in the electronic circuitry which may have occurred, thus adding to the stability and accuracy of the system.

The mechanical coupling provided by the compilation table 40 between the photographs $D_1$ and $D_2$ and the printout negatives $N_1$ and $N_2$ is represented in FIG. 15(a) by the dashed line 100 also extending to the shaft encoder 136, which provides the desired Y position of the table 40, and to various potentiometers 122, and 123 which generate signals corresponding to the position of the table 40 for application to the raster shape modulator 75.

During the time that the system is being controlled in the manual mode, neither the orthophoto cathode ray tube 63 nor the altitude chart cathode ray tube 64 is actuated to print out orthographic or altitude detail on the film sheets $N_1$ or $N_2$ respectively. However, while the system is positioned to scan the various passpoints during the alignment procedure through operation in the mark mode, it may be desirable to transfer the passpoint positions and other particular marks to the orthophoto and the altitude chart. This may be done on a selective basis by switching the mode selector switch 145 from the manual to the mark mode position and by energizing character printing circuitry comprising a character generator 146 and a character selector switch 147. When energized, the character generator 146 provides appropriate character printing signals to the deflection circuitry of the printout cathode ray tubes 63 and 64, These signals are 400 cycle voltages arranged to have appropriate amplitude and phase relationships so that a desired character in the form of a selected Lissajous figure is constructed. The character selector switch 147 determines which of the Lissajous figures is developed at the cathode ray tubes 63, 64. For example, to generate a circle, two 400 cycle voltages 90° out of phase are applied from the character generator 146 to the orthogonal deflection plates of the cathode ray tubes 63, 64 via the deflection circuits 68, 69. From the standpoint of system operation, the exact time in the operating cycle for printing the selected characters is not important. However, it is practical to perform the character printing operation during the manual mode of operation.

Once the appropriate information is supplied to the computer 50, including that which is developed during the alignment procedure just described, the map compilation system of the invention is ready for the automatic profiling operation wherein the system examines geographic positions which are spaced by multiples of 0.01 inch at the system scale along a profile perpendicular to the flight line. These positions are supplied by the system 44 and shaft encoder 136 to the computer 50 which then calculates the location of the homologous areas on the two photographs corresponding to the geographic location. The computer 50, after performing the necessary calculations, commands, through a switch 150, the lens servos 48, 49, 52 and 53 to move lenses 46 and 47 so that the homologous incremental areas corresponding to the given geographic location may be synchronously scanned in order to automatically obtain the true height value of the terrain location. The exact position of the table is available to the computer 50 through the X steps as they occur and through the shaft encoder 136 which monitors the Y table position. The computer then compares the actual and desired positions of the table and if any difference in the values is detected, digital signals are supplied by the computers to servos 48, 49, 52 and 83 through the digital-to-analog converters 56–59 controlled by a D/A control unit 151. The respective servos which are coupled to the focusing lenses 46 and 47 of the scanners 61 and 62 shift the lenses 46 and 47 by appropriate amounts so that the desired incremental areas as initially determined by the computer 50 are scanned. To further increase the speed and accuracy in selecting the appropriate areas for scanning the outputs of the x servo 48 and y servo 52 are connected to the deflection circuit 66 so that any delay in positioning the lens 46 by the lens servos 48 and 52 is compensated by applying a signal proportional to the servo error to the centering control of the flying spot scanner 61. This signal deflects the raster, thereby compensating for the servo position error so that the desired incremental area on the photograph $D_1$ is scanned with a minimum of time lag. Similarly, the servos 49 and 53 are coupled to the deflection circuit 67 to deflect the raster of flying spot scanner 62 so that the proper area is scanned on the photograph $D_2$.

Once the appropriate areas are positioned under their respective scanners, the light beams of the flying spot scanners are modulated by the terrain detail of the corresponding areas. The modulated beams are detected by the photomultipliers 41 and 42 which convert the optical information to corresponding electrical signals which after amplification in video amplifiers 85 and 86 are supplied to the stereo viewer 82 and to the video selector 81 which perform functions already described. The outputs of video amplifiers 85 and 86 are also applied via corresponding automatic gain control (AGC) stages 87 and 88 to the correlator circuit 90 which is a part of the height error sensing stage 76, as previously described with reference to FIG. 8.

If the scanned portions of the two photographs are selected corresponding to the correct effective altitude, there is zero time difference between the respective video signals from the photomultipliers 41, 42 similar in principle to the illustration in FIG. 3(a). In such a case, a zero height error is reported back to the computer by the error sensing circuit 76 through the A/D converter 77. However, if the scanned portions of the photographs $D_1$, $D_2$ are not properly positioned relative to each other, a time difference between the corresponding elements of the respective video signals will be developed in the manner similar to that illustrated in FIGS. 3(b) and 3(c). In this case the error sensing circuit 76 through counter 77 and converter 78 shifts the relative position of the photograph scans until the time difference becomes zero. This height error information in digital form from the counter 77 is utilized by the computer 50 to correct its previous estimate of height of the particular scanned terrain area. This information is then used in extrapolating the altitude of the next area to be examined. For each position being examined, the computer utilizes suitable extrapolation from the previous altitude values to provide the next succeeding altitude estimate. This information is further utilized by the computer 50 to prepare the code which controls the brightness of the beam of the altitude chart printout cathode ray tube 64 by means of an intensity control circuit 155 which also controls the over-all photographic contrast of the film sheets $N_1$ and $N_2$. Similarly, the orthophoto printout cathode ray tube 63 is caused to expose an image on the orthophoto film sheet $N_1$ corresponding to the particular video signal from either photomultiplier 41 or 42 as selected by the video selector 81. As a result, the terrain character is printed out on the orthophoto film sheet $N_1$ and the altitude data is printed out on the altitude chart film sheet $N_2$, hot h at the appropriately scaled terrain coordinate positions.

In another embodiment of the present invention, special "lack of correlation" circuitry is incorporated in the system in order to interrupt the automatic scanning process, when the system becomes lost due to the inability of the analog part of the system to compensate and adjust erroneous height values approximated by the computer 50. FIG. 16 shows a correlator circuit 90 coupled to receive the respective signals directly from the photomultipliers 41 and 42. Assuming that the incrementally scanned areas of photographs $D_1$ and $D_2$ are improperly positioned, the corresponding modulated signals from the photomultipliers will be substantially different in content characteristics so that when they are correlated in the correlator 90 it will result in an output signal which is below a predetermined level set in a threshold circuit 160, resulting in a "lack of correlation" signal. Such signal is supplied to the computer 50 to interrupt the automatic compilation process and to an alarm circuit 161 which audibly alerts the operator. The "lack of correlation" signal is also used as the input signal to a blanking circuit 162 which blanks out the cathode ray tube 63, thereby preventing any erroneous information from being printed out on the orthophoto film sheet $N_1$. The operator, upon being alerted that the system is lost, may examine the respective areas on the photographs $D_1$ and $D_2$ through the stereo viewer 82 and may manually guide the system until it can be reset for automatic scanning.

In order that the scanning of the photographs and the printout of the orthophoto and altitude chart film sheets may proceed without the need for stopping and starting the Y carriage of the compilation table at each point which is to be scanned, an arrangement is provided in accordance with one aspect of the invention which in effect arrests the relative motion of the rasters with respect to corresponding points on the photographs and film sheets. This effect is achieved by a stop motion circuit 165 (FIG. 17) which is arranged to provide signals to the respective deflection circuits 66–69 so as to move the corresponding electron beams to compensate for motion of the compilation table for each point being scanned. Use of the stop motion circuit 165 in the arrangement of the invention in FIG. 15(b) provides zero relative motion between the Y carriage and the rasters during examination of each area under the automatic mode of operation, which advantageously eliminates the necessity of stopping the Y carriage at each scanning cycle.

As shown in greater detail in FIG. 17, the stop motion circuit 165 may comprise a pair of amplifiers 166 and 167 in separate channels which are supplied a rectified rate signal via a rectifier 168 from a tachometer coupled to the Y servo 44A. The rectified signal from the Y servo tachometer has an amplitude which is a linear function of the the velocity of the Y carriage 131 (FIG. 13). Position information is obtained by integrating the rate information in the two separate channels comprising the amplifiers 166, 167 and associated capacitors 170 and 171, coupled in the feedback loops of the respective amplifiers. The outputs of the two integrating channels are coupled to the deflection circuits of the respective cathode ray tubes, thus serving to deflect the rasters of the cathode ray tubes at an appropriate rate to achieve the desired zero relative velocity between the carriage and the rasters. The output of each of the amplifiers 166 and 167 is a sawtooth waveform representing the integral of the input of the Y carriage servo stage. These respective sawtooth waveforms are interlaced as time functions and are respectively terminated by alternate changes in the gray code designation of table position by virtue of the control of the oscillator 173. The computer 50 controls the switch 175 to select between the two waveforms; thus the rasters of the respective cathode ray tubes, including the flying spot scanners, are moved by the corresponding deflection circuits along with the table for a particular computer cycle and, at the beginning of the next computer cycle, are moved to the next desired position where the cycle repeats. This cycle is initiated in accordance with the computer timing operation which is independent of gray code changes that appear regularly during the continuous motion of the compilation table. By virtue of this advantageous arrangement, the respective rasters are controlled to follow the movement of the table so that the relative movement between the two analog systems is arrested for particular intervals which are synchronized with the operating cycle of the digital computer 50. The computer program includes a possible delay interval to accommodate table speeds below the maximum permitted by the program. Thus the digital and analog systems are kept in effective synchronism.

For proper operation of the deflection circuits in response to the tachometer signal, it is extremely desirable to be able to discharge the respective capacitors 170 and 171 rapidly at the proper time while maintaining a high impedance across the capacitors for the extent of the normal operating interval in order to maintain the deflection voltages with a high degree of stability for relatively large intervals of time, particularly during the operation of the system in the manual mode. The circuit of FIG. 17 includes a particular arrangement provided in accordance with an aspect of the invention for achieving the desired operation. The discharging portion of the circuit comprises a pair of energizable discharge devices, such as the neon bulbs 176 and 177, connected across the terminals of the capacitors 170 and 171, respectively. Each neon bulb, 176 or 177, has an associated coil, 178 or 179, wrapped around the bulb and coupled to an oscillator 173 in order to establish a high frequency electromagnetic field in the vicinity of the selected neon bulb. The oscillator 173 is pulsed on with the advent of a change in the gray code applied from the shaft encoder 136 (FIG. 15(a)) and thus provides the required electromagnetic field alternately at one or the other of the neon bulbs in order to ionize the bulb and provide a low resistance discharge path across the associated integrating capacitor. Except when the neon bulbs 176, 177 are ionized, they provide a high impedance leakage path across the associated capacitor, 170 or 171, so that established charge may be maintained thereon with reliable stability for relatively long time intervals. With this described arrangement of the stop motion circuit 165, the system is enabled to move the rasters of the respective cathode ray tubes in accordance with the motion of the compilation table for each incremental position which is being scanned, thus enhancing the over-all accuracy and precision of the system while simplifying the position controlling mechanism of the compilation table carriages.

In still another embodiment of the present invention, the stop motion 165 described above may be replaced by a stop motion circuitry 165' as shown in FIG. 18. The circuitry shown therein eliminates the use of the integrating amplifiers 166 and 167 of FIG. 17 and the circuits associated therewith, and employs digital signal generating techniques which exhibit greater stability when the compilation table is stationary for appreciable periods of time, as when the system is operated in the manual setup made. The signals necessary to cause the centers of the scanning rasters to follow the center of the incremental areas under observation are derived from an optical coding wheel 181 which is attached to the Y lead screw 134 (FIG. 13), producing sixteen pulses for each 0.01 inch of Y travel. The pulses energize a 5-bit counter 182 which is associated with a D/A converter 183. The counter and converter are so adjusted that the most significant bit of the counter, designated by letter e, produces a voltage required to deflect the center of the rasters of the flying spot scanners bye 0.01 inch. The least significant bit, designated by letter a, produces a voltage corresponding to a deflector of 0.000625 inch. As the compilation table moves in the profiling Y direction, the pulses from the optical coding wheel 181 drive the counter, which when passing 0.01 inch switches the most significant bite to a state 1, sending a signal to the computer 50. Voltages generated by the D/A converter 183 continue to increase as a function of the count built up in the counter caused by the pulses from the coding wheel. However, when the computer has completed the computational operation of the particular cycle, a signal is sent back to the counter 182, which in effect resets the bit e to zero, thus reducing the output voltage of the D/A converter by the contribution of that bit, namely a voltage reduction equivalent to a 0.01 inch deflection thereby advancing the scan to move to the next measuring position. As shown in FIG. 18, the output voltage from the D/A converter 183 is supplied to the deflection circuits 66–69 so that the scanning and printout operations of the system may be accomplished while the compilation table moves continuously in a predetermined profiling pattern. As previously stated, the motion of the table changes directions at the end of each Y profiling path, the counter 182 sensing such directional changes so that the voltage outputs of the D/A converter 183 have appropriate signal polarities for the particular directions of motions of the compilation table.

The digital stop motion described above was explained with reference to a particular optical coding wheel, producing 16 pulses per 0.01 inch of Y travel, and a counter of 5 binary bits. However, it is apparent that the specific figures were presented for explanatory purposes only and that other combinations may be employed to accomplish the desired stop motion results. For example, a reversible counter operating from a two-bit optical encoder may be used, the latter arrangement further simplifying the system by eliminating the need of reversing the output polarity of the voltages from the D/A converter 183 as the compilation table changes direction in its profiling pattern.

It is apparent from the foregoing description that the automatic map compilation system in accordance with the above described embodiments of the present invention may be operated to develop satisfactory photographic maps representing image detail and height information from respective pairs of aerial photographs. Further, it is clear that the accuracy of the derived information is a function of the photographs being scanned by a pattern that is appropriate for the particular area under observation at a given time. This is typically a varying pattern, namely, a skewed raster so that the instantaneous point under observation coincides with the point printed out on the orthophoto film sheet $N_1$.

As previously described, the scanning rasters of the photographs $D_1$ and $D_2$ are skewed in the raster shape modulator 75 in accordance with slopes calculated from the relative heights of previously measured areas in the neighborhood, which have been temporarily stored in the computer 50. It is apparent therefore that the computer must be of substantial capacity and speed. Since the latter parameters are usually related to the availability and price of the computer, and in order to increase the overall system accuracy, raster skewing techniques which require a minimum of information from the computer were developed and incorporated in a preferred embodiment of a raster shape modulator 75', as shown in block diagram form in FIG. 19. For convenience, the equations (10) and (11) previously developed in connection with the raster shape modulator 52 discussed above, are reproduced below:

$$\Delta x = [G_X + G_{2x} Z_X]\Delta X + [G_X + G_{ZX}Z_Y]\Delta Y \quad (10)$$

$$\Delta y = [H_X + H_{ZX} Z_X]\Delta X + [H_Y + H_{ZX}Z_Y]\Delta Y \quad (11)$$

Figure 7C:
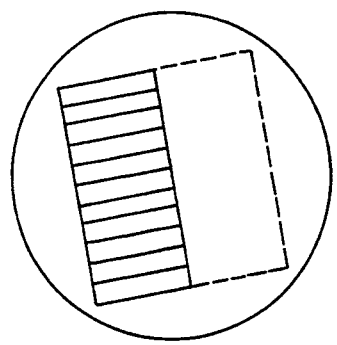
Figure 7D:
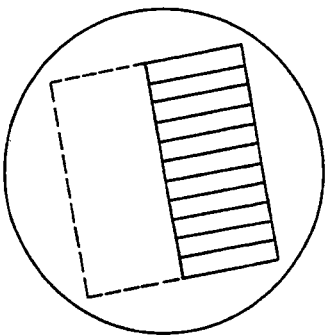
Figure 7E:
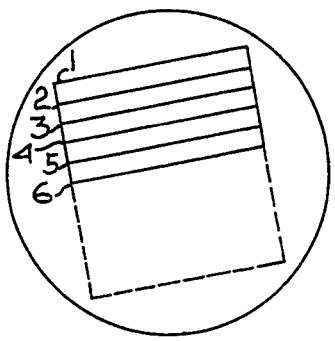
Figure 7F:
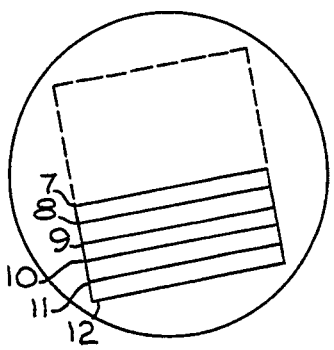

In FIG. 19, the raster shape modulator 75', which is incorporated in a preferred embodiment of the present invention, comprises an X-tilt sensor 191 which is energized by the output signals from a correlator circuit 90", similar in performance to the correlator 90 shown in FIG. 11 which serves as the height error correlator circuit by correlating video signals from areas scanned as shown in FIG. 7(a). However, the output signals from the correlator 90" are not from a complete frame but, switched at the middle of each scanning line, and alternately supplied to the two differential inputs A and B of the X-tilt sensor 191, as for example the correlated signals from scanned patterns as shown in FIGS. 7(c) and 7(d) are supplied to the inputs A and B respectively of the sensor 191. The sensor 191 senses any relative height differentials between the incremental areas of FIG. 7(c) and 7(d) which represent the X-slope of the complete area under observation as shown in FIG. 7(a). The output signal of the sensor 191 is in distal form representing the X terrain slope component $Z_X$ which may when desired be supplied to the register 120 (FIG. 12) of the raster shape modulator 75. Similarly, a Y-tilt sensor 192 has its two input terminals C and D alternately connected to the output of the correlator 90". However here the switching occurs at the middle of the scanning frame so that relative height differentials between the incremental areas of FIGS. 7(e) and 7(f) are sensed in the Y-tilt sensor 192, resulting in a digital output signal which represents the Y terrain slope component $Z_y$ of the area under observation. The other partial derivatives of equation (10) are generated in a generator generally designated by numeral 193, which receives digital signals from the computer 50 and analog signals from the compilation table 40. One analog output $G_Z$ of the generator 193 is used as the varying reference voltage of a D/A converter 194 which is operated on by the digital signal $Z_X$ from the X-tilt sensor 191. The analog signal from the D/A converter 194 is then added to an analog signal $G_X$ from the generator 193 in a summation circuit 195. The entire sum is integrated in an integrator 196, using the horizontal line scan timing signal from the deflection circuits in conjunction with the sync pulse generator 71 (FIG. 4) for synchronization, and thereby obtaining a signal representing the first expression of the right side of equation (10).

Similarly, a signal representing the second expression of the right side of equation (10) is gene rated by using the digital signal $Z_y$ of sensor 192 to operate on the analog signal $G_Z$ in a D/A converter 197 the signal output product $G_Z Z_Y$ being added to a signal $G_Y$ from the generator 193, in a summation circuit 198, the sum signal $G_Y + G_Z Z_Y$ being integrated in an integrator 199 which is synchronized by the vertically scan timing signal the output signal of the integrator being $[G_Y + G_Z Z_Y] \Delta Y$. The analog output signals of the integrators 196 and 199 are then added in a summation circuit 200 to obtain the signal $\Delta x$ used as the horizontal sweep component of the scanning raster. For explanatory purposes, only the circuitry necessary to generate the x sweep component for one photograph, namely $D_1$, is shown. However, it is pointed out that the raster shape modulator 52' further comprises a circuit similar to those described above, used to generate signals representing the expressions in equation (11) thereby furnishing the y sweep component:: for generating the complete, scanning raster of the photograph $D_1$. A second raster shape modulator 52' operating with somewhat modified parameters generates the scanning raster for second photograph $D_2$, the rasters scanning both photographs being skewed as a function of the various partial derivatives in the equations (10) and (11).

For a better understanding of the tilt sensors 191 and 192 reference is made to FIG. 20 wherein both sensors are represented in a complete block diagram. The output of the correlator 90" is connected to one of the two input terminals A and B of a differential summing integrator 201 which serves as the input subunit of the sensor 191. The output of the correlator 90" is sampled using a positive input for half a scan and a negative input for the remainder of the scan, switching occurring at the middle of each scanning line (see FIGS. 7(c) and 7(d)). The switching may be accomplished using known signal switching techniques which are based on electronic or electromechanical principles. If the correlator 90" indicates a high error in the early part of a scan period and a low error in the latter half, a net voltage of corresponding polarity indicative of the direction of slope is produced at the output of the integrator 201 and is applied to positive and negative trigger circuits 202 and 203, respectively. The trigger circuits are conventional threshold devices, such as well known Schmitt triggers; one (202) is set so that it will trigger when the output signal of the integrator exceeds a positive threshold level set thereon while the other (203) is set so as to produce a pulse when the output of the integrator (321) is below a correspondingly negative threshold level. When a pulse is produced by either of the trigger circuits, a reversible counter 204 is stepped one position in a corresponding direction. At the same time, the particular trigger circuit which caused the counter to advance resets the summing integrator 201 through an OR gate 205 in order to allow a new independent evaluation of any remaining differential heights of the incremental areas being scanned. The output of the reversible counter 204 represents in digital form the previously discussed partial derivative $Z_X$ which is used in the raster shape modulator 75' as shown in FIG. 19. As the reversible counter 204 advances and the scanning raster is skewed by the raster shape modulator, the differential output from the correlator 90" decreases. When height differential in the scanned area is no longer present, the threshold settings in the trigger circuits 202 and 203 will not be exceeded and the reversible counter will maintain its last value resulting in the proper X-slope value being entered into the equation (10). The operation of the Y-tilt sensor 192 shown in FIG. 20 is identical to that of the X-tilt sensor 191 described above, with the sole exception that the signals from the correlator 90" are alternately applied to a differential integrator 201', with switching taken place at midframe (see FIGS. 7(c) and 7(f)) so that height differentials within the incremental area being scanned in the Y direction may be detected, producing a $Z_y$ digital output signal which is the Y-slope partial derivative component in equation (10).

Referring again to FIG. 19, it is apparent that the raster shape modulator 75' diagrammed therein may generate sweep signals in accordance with the generalized equation (10), which includes all the partial derivatives of the photograph coordinate transformation function $x = G(X, Y, Z)$. Such derivatives in addition to compensating for terrain slope as described above, may also compensate for aircraft "crabbing" along its line of flight occurring when the camera axis does not line up with the line of flight and for other variables such as camera tilt and elevation differences of the airplane at the times that the two photographs were made.

In one specific idealized geometric interrelationship where none of the above variations such as "crabbing" or altitude changes are present, the generalized equation (10) takes the following specific form;

$$\Delta x = [f/Z - f/Z^2(X-D) \ Z_X]\Delta X - [f/Z^2(X-D)Z_y]\Delta Y \qquad (12)$$

where, f represents the camera focal length, Z represents distance of terrain image below the airplane; X and Y are the coordinates of the compilation table 40, and D is the displacement of the photograph center with respect to machine center.

Reference is now made to FIG. 21 wherein a specific embodiment of part of the raster shape modulator 75' is shown, which is operable to produce a signal represented by equation (12). In FIG. 21 the partial derivative generator 193 comprises a D/A converter 211 which receives from the computer 50 a reference voltage in the form of voltage bias which is proportional to the camera focal length f. The computer 50 also supplies a digital signal Z which operates on the converter 211, producing an analog output signal equal to f/Z. This voltage is in turn used as a varying reference voltage of a D/A converter 212, which is also operated on by the digital signal Z, thereby producing an analog output equal to $f/Z^2$. The converters 211 and 212 are essentially of conventional design except for having digital signals operating on varying analog reference voltages rather than on fixed reference voltages which are ordinarily present in conventional digital-to-analog (D/A) converters. The output voltage of the D/A converter 212 with its complement (as inverted in an inverter 213) are applied to an X potentiometer 215 attached to the photograph carriage and to a manually set D potentiometer 216. By reversing the X potentiometer input polarities, the voltage at the wiper is $f/Z^2$ multiplied by the complement of the X carriage position. D, the photo offset distance is also multiplied by $f/Z^2$ and both signals are added in a conventional summation circuit 218, resulting in an output signal represented by the quantity $(f/Z^2) (-X+D)$ which equals $-(f/Z^2) (X-D)$. The remainder of the operation of the circuit shown in FIG. 21 performs in a manner similar to the circuit shown in FIG. 17 which has been described in detail. It should be noted that the circuit of FIG. 21 generates only the $\Delta x$ sweep components as represented by equation (12). However, the following equation $$\Delta y=[f/Z-(f/Z^2)\ Y\ Z_Y\ \Delta Y-[(f/Z^2)\ Y\ Z_X]\Delta X \quad (13)$$

which is a specific representation of the generalized equation (11) is similarly generated in the raster shape modulator 75'. Thus, both the x and y sweep components are available to scan both photographs with scanning rasters which are skewed so as to account for terrain shape variations in directions parallel and perpendicular to the line of flight.

In the foregoing description of the several embodiments of the present invention, it is as pointed out that correlation techniques are employed to sense errors in elevation of the incremental areas under observation as determined by the computer 50. The sensed elevation errors are then compensated for in the analog part of the compilation system by shifting the relative positions of the scanning rasters of the deflection circuits 66 and 67 in the direction of the line of flight, which is the X coordinate of the compilation system. Correlation methods are also used to sense terrain slope or tilt directions and compensate for such changes by skewing the rasters scanning the photographs. thereby further increasing the overall accuracy of the output orthophoto and drop line information derived from appropriately scanning the incremental areas under observation. However, as previously stated in some cases where the terrain tilt changes are minimal the skewing of the scanning rasters may not be deemed necessary and therefore the raster shape modulators 75 and 75' described above need not be incorporated in the system disclosed herein.

In still a further embodiment of the present invention correlation techniques are also employed to detect and compensate for any parallax in the aerial photographs in a direction perpendicular to the line of flight or, in other words, in the Y direction of the coordinate system. Such Y-parallax may result from relative photographic dimensional instability and other photographic factors which produce an unpredictable relative difference parallel to the Y-axis, of the distances of two homologous images from the origins of their respective rectangular coordinate systems. While normal mapping photography yields models with quite low Y-parallax, yet it is often advantageous to be able to compensate for any Y-parallax that may be present in otherwise satisfactory stereo pairs which could not otherwise be used to accurately extract the desired mapping information therefrom.

For a better understanding of the application of correlation techniques to compensate for any Y-parallax present in a stereo pair, such as the photographs $D_1$ and $D_2$ of FIG. 4, reference is made to FIGS. 22(*a*) and 22(*b*), wherein there are shown line scanning patterns used in scanning incremental areas $S_1$ and $S_2$ on photographs $D_1$ and $D_2$, respectively. In FIG. 22 (*a*), both incremental areas $S_1$ and $S_2$ are shown as being scanned by conventional line patterns similar to the pattern shown in FIG. 7(*a*). The outputs of the associated photomultipliers 41 and 42 are connected to a correlator similar to the correlator circuitry 90 of FIG. 8 used for height error detection. The delay lines 93 and 94 (FIG. 8) are made precisely equal to the fast scan period or a multiple thereof so that a given scanning line on one photograph is compared differentially with a line above and below on the other photograph. For example, by setting the delays 93 and 94 precisely equal to one fast scan period, the scanning line 2 of $S_1$ (FIG. 22(*a*) ) is correlated in a correlator similar to correlator 92 (FIG. 8) with the scanning line 1 of $S_2$, while in a correlator similar to correlator 91 line 2 of $S_1$ is correlated with line 3 of $S_2$. If there is no Y-parallax, the correlation outputs of correlators 91 and 92 are substantially equal with a zero difference output signal from the correlator circuit 90. If there is some parallax, one correlator (91 or 92) will show a higher output than the other with the net difference amplified in amplifier 95, indicating a relative drift of the two scanned areas. The output of the amplifier 95 is used to shift the scanning rasters of the photographs $D_1$ and $D_2$ in a direction perpendicular to the line of flight, so that homologous areas on the two photographs are scanned irrespective of Y-parallax present in the photographs.

Techniques other than those described above may be used to detect any Y-parallax. For example, the areas $S_1$ and $S_2$ on the two photographs may be scanned as shown in FIG. 22(*b*), wherein the vertical scan of $S_2$ has a small fast component signal added to successive scans so that it takes the form as shown. By correlating lines 1 and 1, 2 and 2, and so on of $S_1$ and $S_2$ respectively of FIG. 22(*b*), and feeding the correlated outputs from the odd lines to one terminal of a difference amplifier, and the correlated outputs from the even lines to the other terminal of such a difference amplifier, the amplifier's output and polarity will be directly related to the magnitude and direction of the Y-parallax error. In the latter mentioned technique, the need of time delays is eliminated, since the switched scanning pattern of $S_2$ accomplishes the same purpose.

In still another example of Y-parallax detection and compensation technique, the incremental areas $S_1$ and $S_2$ on the two photographs are conventionally scanned as shown in FIG. 22 (*a*). However, the scanning raster of the deflection circuit of one of the photographs is provided with a small cyclic deflection in the Y direction at one half the frame scan rate. The photomultipliers signals are passed to a single correlator unit which has its output switched at the frame scan rate between positive and negative inputs of a differential summing integrator. If no Y-parallax is present in the photographs, the correlation output signals from successive frame scans will be equal so that the output: of the summing integrator will be substantially zero. However, if some Y-parallax is present, the correlated output signal of one frame where the cyclic offset is in the direction to compensate the output signal will be greater than the output signal of the next frame where the cyclic offset is in the opposite direction, thereby accentuating the parallax. The result is non-cancelling input signals to the integrator, which accumulates and amplifies any difference between the two signals and applies a correction signal to the y-axis deflection circuit receiving the cyclic input previously mentioned.

All the foregoing embodiments of the invention have been described as incorporating scanning rasters as shown in FIG. 7(*a*). The rasters, defined as predetermined patterns of scanning providing substantially uniform coverage of a predetermined area, comprise sequentially scanned lines. The lines are scanned from left to right and top to bottom of the france, as represented in FIGS. 7(*a*) through 7(*f*).

As previously explained, the modulated signals generated by scanning the incremental areas of the photographs $D_1$ and $D_2$ are used in the analog part of the system to derive height, slope, and parallax error signals, by correlating signals from predetermined portions of the frame scan. For example, a Y-axis slope error signal is derived by correlating signals of patterns 7(*e*)

and 7(f). A close observation of the patterns of FIGS. 7(e) and 7(f) reveals that during the first half of the frame scan only the top half of the frame is scanned while the bottom half of the frame is scanned during the second half of the frame scan period, making it apparent that nearly a complete frame scan period has to elapse before sufficient signals from both patterns are present so as to derive therefrom the Y-axis slope signals as explained above. Similarly, accurate height and X-axis slope error signals may only be derived after a substantial part of the frame has been scanned. Experience has indicated that in some systems the time necessary for scanning, before sufficient signals are available for correlation and derivation of the error signals, is relatively long with respect to the time available for error analysis and computations.

Therefore, in another embodiment of the present invention a novel interlaced scanning pattern as shown in FIGS. 23(a)–23(e) is incorporated in the automatic map compilation systems described herein. FIG. 23 (a) is a simplified diagram of a scanning pattern similar to FIG. 7(a) except for the location of the sequentially generated lines within the frame. Whereas in FIG. 7(a) the lines (1 through 12) scan the frame in a unidirectional, namely, from top to bottom, the lines in FIG. 23(a) are located in a predetermined pattern so that alternating lines scan incremental portions of the top and bottom half frames as shown in FIGS. 23(d) and 23(c). From FIGS. 7(a) and 23(a) it is clear that even though the entire frame of FIG. 23(a) is covered by the same number of lines (12 lines) as the frame in FIG. 7(a), yet each group of lines in the new scanning pattern yields a much better average of the total frame information than was formerly available, that error signals may be derived by employing shorter integration times, thereby shortening the time required for error signal analysis. The predetermined pattern of the lines within the frame scan is controlled by the vertical sweep voltages supplied to the deflecting circuits 66 and 67 (FIG. 4) which control the positions of the beams in the scanning rasters. In one practical embodiment of a scanning pattern as described herein, the complete frame scan comprises 128 lines, with the y sweep voltage being generated through a 7-bit counter 221 with an associated D/A converter 222 as shown in FIG. 24(a). The output voltage of the D/A converter 222 will be directly related to the binary count in the counter 221. As shown in FIG. 24, the least bit which is energized by the sync pulse generator 71 (FIG. 4) for every scanning line produces a reversal in the polarity of the output voltage of the associated D/A converter, while the second bit in the counter 221 causes the D/A converter 222 to generate a voltage which will deflect the beam by one-quarter of the total frame height, from the frame center. The other five bits have the weights as shown in FIG. 24. A bias voltage level proportional to $$\frac{1}{256}$$

of the frame height is superposed on the output of the D/A converter 222 so that the first count in the counter will cause the D/A converter to produce a proportional voltage with a negative polarity so that the first line scans a portion of the bottom half of the frame as shown in FIG. 23(a). The next count will produce an output voltage of ¼ plus $$\frac{1}{256}$$

the total vertical frame sweep potential with a positive polarity causing the beam to scan a portion of the top half of the frame. The third count will produce the same voltage as before except for the change in polarity causing the beam to scan the bottom half of the frame. The entire frame will be filled after 128 steps only the first 12 lines being shown in FIG. 23(a), the sequentially generated scanning lines gathering information from alternating halves of the frame. Further, the invention enables the sampling of video information from a large part of the scan after only a relatively short time as compared to a complete frame scan cycle. The above specific example of the scanning pattern is given for purposes of illustration only, it being understood that such specific values are intended to limit the invention which enables the gathering of video information, which is equally weighted, of either side of the center frame after each pair of line scans. The principles of the technique herein described can further be used in coding transmitted classified video information so that received lines may be properly oriented with respect to one another so as to produce video information of a complete frame.

Summarizing briefly, on the basis of automatic map compilation systems thus far described, it may be stated that the computer 50 (FIG. 4) monitors, by means of position readout unit 45, the position of the table 40 on which the pair of aerial photographs are positioned. On the basis of the position of the table, and the calculations performed therein in accordance with the transformation functions previously defined, the computer 50 calculates the respective incremental areas on the photographs to be scanned and causes the lenses 46 and 47 to move (by energizing servos 48, 49, 52 and 53), so that the appropriate incremental areas are indeed being scanned by the rasters of the flying spot scanners 61 and 62.

In still another embodiment of the present invention appropriate scanning of calculated incremental areas is achieved by the computer 50 controlling, rather than monitoring the position of table 40, so that lenses 46 and 47 may be in fixed positions similar to lenses 83 and 84 thereby eliminating the need of servos 48, 49, 52 and 53, further reducing the storage and computational capacity of the computer 50.

Reference is now made to FIG. 25, which is a simplified block diagram of an arrangement wherein the computer 50 controls the exact position of the table 40 for proper compilation of mapping information. As previously stated, the computer 50 calculates the desired position of the table and supplies the signals through a D/A converter 331 to a differencing amplifier 332 which is also energized through a D/A converter 333 by signals from an optical encoder 334 that continuously monitors the exact position of the table. The difference between the analog outputs of the converters 331 and 333 is the instantaneous error in the position of the table. This error is then supplied by amplifier 332 to the servo, controlling the movement of the table so that the positioning error is eliminated. The output of amplifier 332 is also supplied to the deflection circuits 66 and 67 so that the rasters therein may be appropriately shifted to compensate for any error still present in the position of the compilation table.

In still another embodiment of the present invention, the computer 50 controls the position of the compilation table 40 by an arrangement similar to the one shown in FIG. 25 except that the optical encoder 334 energizes the D/A converter 333 through a reversible counter (not shown) which is periodically "read" and later reset by the computer. On the basis of the reading, the computer determines the magnitude of error in the position of a first point, and calculates the magnitude of the digital signal necessary to supply to D/A converter 331 in order to move the table to the second point selected for scanning. In either of the last two embodiments of the present invention wherein the computer controls the table position, the optical encoder 334 and the D/A converters 331 and 333 are of sufficient sensitivity and capacity so as to produce error signals corresponding to the desired positioning accuracy of the system. Further, it should be apparent that in either of the last two embodiments of the present invention wherein the computer controls the table position and wherein the lenses 46 and 47 are in fixed positions, only photographs taken under optimum conditions, namely vertical photography and both taken from the same altitude, may be used, since the only variable means for the computer 50 to direct scanners 61 and 62 to the computed homologous areas is by deflecting the beams of the scanners, such deflection being of relatively limited range.

In still another embodiment of the present invention, each of the stereoscopic photographs $D_1$ and $D_2$ and the film sheets $N_1$ and $N_2$ shown in FIG. 4 as mounted on the table 40, are actually mounted on individual compilation tables 341–344 respectively as shown in FIG. 26. The operator console 340 shown therein, includes the various circuits necessary for the manual and mark modes of the system as previously explained, and the computer 50 separately controls each of the four tables.

Briefly, tables 343 and 344 are moved in the fixed profiling pattern, so that the orthophoto and the altitude chart may be printed thereon. However, during each cycle of operation of the computer, the computer, instead of moving the scanning optics over the two photographs as a result of the estimated height and locations of the homologous incremental areas, moves the tables 341 and 342. Then, the scanning is performed and error signals produced, to indicate to the computer the error in the estimates, computed for the particular scanned incremental areas as representing homologous imagery. This signal is used by the computer to update the information therein for subsequent estimates of the locations of another pair of incremental areas as representing homologous imagery. Thus, it can be generally stated that in the embodiments in which the two stereoscopic photographs are supported on a single table, such as that designated by numeral 40 in FIG. 4, the computer, as a result of the estimates computed therein, moves the scanning optics with respect to the two photographs so that portions thereof, estimated to represented homologous imagery, are scanned. However, in the arrangement as shown in FIG. 26 in which the two photographs are supported on separate tables (341 and 342), the computer moves these tables with respect to the scanning system so that a fixed scanning system is located above the portions of the photographs assumed, or estimated, by the computer as representing homologous imagery. Also a system greatly increases the overall versatility of the system in that photographs with different dimensions and printout film sheets of preselected dimensions may be utilized. For example, the preparation of aerial mosaic s defined as the compilation of individual aerial photographs fitted together systematically to form a composite view of an entire area covered by the photographs may be greatly simplified, by using large photographs, each pair printing out only a relatively small area on the orthophoto and altitude photo sheets so that a single large mosaic is automatically produced.

From the foregoing detailed description, it should be apparent that applicant has herein disclosed a novel automatic compilation employing a digital computer and an analog subsystem. While the invention has been described in conjunction with automatic map compilation developing an orthophotograph and an altitude chart from information derived from a pair of stereoscopic photographs, it is clear that the system is not limited thereto; rather, the principles described above may be utilized in many other ways.

Furthermore, by virtue of the inclusion of a computer in the system, added versatility is provided since modifications in the computer program permit the adaptation of the system to the solution of problems related to the information in the stereoscopic photographs. Problems related to "cut and fill" in construction projects over large areas, or the selection of road paths between remote points, may be conveniently solved by the automatic system described herein. For example, the height interval information provided in the presently described system in the forth of an altitude chart may be simultaneously stored on any known computer storage media such as magnetic tape, and later used to determine the height of all incremental areas within a predetermined area above and below a selected reference, thereby automatically calculating the amount of cut and fill required to level the area at a height equal to the selected reference. As to the selection of preferred roadpaths between predetermined points, the computer may be appropriately programmed by properly selecting coefficients of the transformation functions previously described so that the apparent line of flight of the airplane taking the stereoscopic photographs is appropriate to make the predetermined points appear to be at the same altitude, thereby introducing apparent differential height values in all intermediate points so that a preferred route between the points may be automatically determined.

The height interval information provided in this system in the form of the altitude chart may also be used in other associated equipment by directly applying the derived information to control the movement of a milling machine or other cutting tool, for example, to make relief models or reproduce a particular contour or desired pattern.

Although there has been described above a specific arrangement of an automatic map compilation system in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. An automatic map compilation system, for deriving information from a pair of stereoscopic photographs by scanning portions thereof which represent homologous imagery comprising:

first means for scanning at least portions of a pair of stereoscopic photographs and developing video signals in accordance therewith;

second means including computing means, operable in a sequence of cycles of operation, for estimating for successive cycles of operation, on the basis of at least photogrammetric data related to said pair of photographs, the portions of said photographs which represent homologous imagery and controlling said first means to synchronously scan said portions; and third means responsive to said video signals for comparing said video signals therein and producing error signals which represent the degree of error in said second means in estimating said portions of said photographs as representing homologous imagery said second means including means responsive to said error signals for updating the estimate of the locations of portions of said photographs, which represent homologous imagery, adjacent the scanned portions.

2. An automatic map compilation system for deriving information from a pair of stereoscopic photographs by scanning portions thereof which represent homologous imagery comprising:

first means for scanning at least portions of a pair of stereoscopic photographs and developing video signals in accordance therewith;

second means, including computing means for storing photogrammetric data related to said pair of stereoscopic photographs and means for cyclically estimating for each cycle of operation of said second means, the locations of portions of said photographs which represent homologous imagery and for moving said photographs with respect to said first means, so that said first means synchronously scan the portions, the locations of which were estimated by said computing means; and third means responsive to said video signals for correlating the signals therein and producing error signals which indicate an error in the estimates computed in said second means, said second means being responsive to said error signals to update the estimates computed therein.

3. An automatic map compilation system, for deriving information from a pair of stereoscopic photographs by scanning portions thereof selected as representing substantially homologous imagery first means for scanning a pair of stereoscopic photographs and developing video signals in accordance therewith;

computing means, including means for storing photogrammetric data related to said pair of stereoscopic photographs and means for estimating, on the basis of said photogrammetric data and information derived during scanning contiguous portions of said photographs, for each cycle of operation of said computing means, portions of said pair of stereoscopic photographs substantially representing homologous imagery, said computing means further including means for controlling the positions of said photographs with respect to said first means, so that said first means means said estimated portions; and second means responsive to said video signals for comprising said video signals therein, and producing information signals which are related to the degree of error in the selection of said portions as representing homologous imagery.

4. An automatic map compilation system for deriving data from a pair of stereoscopic photographs by scanning incremental areas thereof comprising:

means for scanning a pair of stereoscopic photographs of an object and developing video signals in accordance therewith;

computing means for controlling the positions of said means for scanning with respect to said pair of stereoscopic photographs to cause synchronous scanning of a first pair of incremental areas on said pair of stereoscopic photographs, said incremental areas having been selected on the basis of photogrammetric data including estimated height related to said pair of stereoscopic photographs as representing homologous object imagery;

means responsive to said video signals for analyzing said video signals therein and producing error signals which represent the degree of error in selecting said first pair of incremental areas as representing homologous object imagery; and means for energizing said computing means with said error signals for updating therein said estimated height of the homologous object imagery represented in said first pair of incremental areas and for use in selecting a second pair of incremental areas on said pair of stereoscopic photographs as representing homologous object imagery.

5. An automatic map compilation system for deriving terrain height information from a pair of stereoscopic photographs of terrain, by scanning incremental areas thereof, comprising:

means for scanning a pair of stereoscopic photographs of terrain and developing video signals in accordance therewith;

computing means for controlling said means for scanning to cause synchronous scanning of a first pair of incremental areas on said pair of stereoscopic photographs, the locations of said incremental areas one said pair of stereoscopic photo having been computed on the basis of photogrammetric data including estimated height related to said pair of stereoscopic photographs as representing homologous terrain imagery;

means responsive to said video signals for analyzing said video signals therein and producing error signals which represent the degree of error in computing said first pair of incremental areas as representing homologous terrain imagery; and means for energizing said computing means with said error signals for updating therein said estimated height of the homologous terrain imagery represented in said first pair of incremental areas and for use in computing the locations of a second pair of incremental areas on said pair of stereoscopic photographs as representing homologous terrain imagery.

6. An automatic map compilation system for recording terrain data, derived from scanning incremental areas of a pair of stereoscopic photographs of terrain comprising:

means for scanning a pair of stereoscopic photographs of terrain and developing video signals in accordance therewith;

computing means for controlling said means for scanning to cause synchronous scanning of substantially homologous incremental areas on said photographs in accordance with preprogrammed photogrammetric data related to said pair of stereoscopic photographs;

means responsive to said video signals for developing scanning error signals for adjusting the relative incremental areas Of the photographs being synchronously scanned, said scanning error signals also energizing said computing means for further controlling said means for scanning said pair of photographs; and output means for recording terrain data derived from the synchronously scanned homologous areas of said pair of stereoscopic: photographs.

7. An automatic map compilation system for deriving data from a pair of stereoscopic photographs by scanning incremental areas thereof, which represent homologous terrain imagery comprising:

means for scanning a pair of stereoscopic photographs of terrain and developing video signals in accordance therewith;

computing means for controlling said means for scanning to cause synchronous Scanning of a first pair of incremental areas on said pair of stereoscopic photographs, said incremental areas having been computed by said computing means on the basis of photogrammetric data including estimated height related to said pair of stereoscopic photographs as representing homologous terrain imagery;

means responsive to said video signals for analyzing said video signals therein and producing error signals which represent the degree of error in said computing means in computing said first pair of incremental areas as representing homologous terrain imagery;

means for energizing said computing means with said error signals for updating therein estimated height of the homologous terrain imagery represented in said first pair of incremental areas and for computing a second pair of incremental areas on said pair of stereoscopic photographs as representing homologous terrain imagery; and output means for recording data related to the terrain represented by said homologous terrain imagery from signals derived from the scanning of said first pair of incremental areas.

8. An automatic map compilation system for deriving data from a pair of stereoscopic photographs of terrain by scanning incremental areas thereof, comprising:

means for scanning a pair of stereoscopic photographs of terrain and developing video signals in accordance therewith;

computing means for controlling said means for scanning to cause synchronous scanning of a first pair of incremental areas on said pair of stereoscopic photographs, said incremental areas having been computed by the computing means on the basis of photogrammetric data related to said pair of stereoscopic photographs as representing homologous terrain imagery;

means responsive to said video signals for analyzing said video signals therein and producing error signals which represent the degree of error in said computing means in computing said first pair of incremental area as representing homologous terrain imagery;

means for energizing said computing means with said error signals for updating therein estimated height of the homologous terrain imagery represented in said first pair of incremental areas and for computing a second pair of incremental areas on said pair of stereoscopic photographs as representing homologous terrain imagery; and means for recording data of terrain represented by said homologous terrain imagery in response to said video signals developed during scanning of said first pair of incremental areas, and in response to signals representing updated estimated height from said computing means.

9. In an automatic map compilation system in which, incremental areas of a pair of stereoscopic photographs, supplied to said system, arm scanned to derive information therefrom, the improvement comprising:

means for scanning a pair of stereoscopic photographs;

computing means for controlling positions of said means for scanning with respect to said photographs to cause synchronous scanning of portions thereof in accordance with photogrammetric information stored by said computing means;

means for generating signals corresponding to imagery in the scanned portions of the photographs; and means responsive to said video signals for developing scanning error signals for adjusting the relative incremental areas of the photographs being synchronously scanned, said scanning error signals also energizing said computing means for further controlling the homologous incremental areas on said photographs for synchronous scanning.

10. An automatic map compilation system for printing out information derived from scanning portions of a pair of stereoscopic photographs of terrain comprising:

means for scanning a pair of stereoscopic photographs;

computing means for controlling positions of said means for scanning with respect to said photographs to cause synchronous scanning of portions thereof in accordance with photogrammetric information stored by said computing means;

means for generating video signals corresponding to imagery in the scanned portions of the photographs;

means responsive to said video signals for developing scanning error signals for adjusting the relative incremental areas of the photographs being synchronously scanned, said scanning error signals also energizing said computing means for further controlling the subsequent selection of portions of said photographs for synchronous scanning; and means for printing out an orthophoto corresponding to said generated signals and an altitude chart corresponding to the height of the terrain represented in the stereoscopic photographs substantially concurrently with the operation of scanning.

11. An automatic map compilation system for printing out terrain data by scanning portions of a pair of stereoscopic photographs of terrain comprising:

scanning means for scanning a pair of stereoscopic photographs;

computing means including means for storing photogrammetric information related to said pair of stereoscopic photographs for controlling positions of said means for scanning with respect to said photographs to cause synchronous scanning of portions thereof in accordance with the photogrammetric information stored by in said computing means;

means for generating signals corresponding to imagery in the scanned portions of the photographs;

means including correlating circuitry responsive to said generated signals for developing error signals, said scanning means being responsive to said error signals for deflecting said scanning means so as to change the positions of the centers of the portions of said photographs which are synchronously scanned so that substantially homologous incremental areas of the photographs are synchronously being scanned; and means for printing out an orthophoto corresponding to said generated signals and an altitude chart corresponding to the height of the terrain represented in the stereoscopic photographs, substantially concurrently with the operation of scanning.

12. An automatic map compilation system for printing out an orthophoto and an altitude chart from signals derived by scanning incremental areas of a pair of stereoscopic photographs comprising:

means for scanning a pair of stereoscopic photographs and developing video signals in accordance therewith;

computing means for controlling said means for scanning to cause synchronous scanning of substantially homologous incremental areas on said photographs in accordance with photogrammetric data stored therein related to the pair of stereoscopic photographs;

means responsive to said video signals for developing scanning error signals for adjusting the relative incremental areas of the photographs being synchronously scanned, said scanning error signals also energizing said computing means for further controlling the homologous incremental areas on said photographs for synchronous scanning; and means for printing out an orthophoto corresponding to said generated signals and an altitude chart corresponding to the height of the terrain represented in the stereoscopic photographs substantially concurrently with the operation of scanning.

13. An automatic map compilation system for recording information derived by scanning incremental areas of a pair of stereoscopic photographs comprising:

means for scanning a pair of stereoscopic photographs and developing video signals in accordance therewith;

computing means for controlling said means for scanning to cause synchronous scanning of substantially homologous incremental areas on said photographs in accordance with photogrammetric data stored therein related to the pair of stereoscopic photographs;

means responsive to said video signals for developing scanning error signals for adjusting the relative incremental areas of the photographs being synchronously scanned, said scanning error signals also energizing said computing means for further controlling the homologous incremental areas on said photographs for synchronous scanning; and means for incrementally recording image detail from said synchronously scanned homologous incremental areas and altitude information derived from the synchronously scanned homologous areas of the stereoscopic photographs.

14. An automatic map compilation system for deriving printable information by scanning incremental areas of a pair of stereoscopic photographs comprising:

scanning means for electronically scanning a pair of stereoscopic photographs;

means for generating electrical signals corresponding to imagery in scanned portions of said photographs;

means for correlating said electrical signals to detect relative time displacements therebetween and producing height error signals in accordance therewith;

means responsive to said height error signals for modifying the portions of said photographs being synchronously scanned to establish time coincidence between said electrical signals generated during the synchronous scanning of the portions of said photographs;

a computer responsive to said height error signals for calculating altitude information of the portions of said photographs being synchronously scanned in accordance therewith and with photogrammetric information stored therein, said computer further controlling relative portions of said photographs to be scanned;

first printout means coupled to receive said electrical signals for providing a record in orthographic projection corresponding to said stereoscopic photographs; and second printout means coupled to the computer for providing: a record indicative of the altitudes of the record printed out by said first printout means.

15. An automatic map compilation system for deriving printable information by scanning portions of a pair of stereoscopic photographs comprising:

positioning means for positioning a pair of stereoscopic photographs and a photosensitive film sheet in predetermined fixed relationships to each other;

scanning means for electronically scanning predetermined portions of said stereoscopic photographs, said portions defining centers;

means for moving said positioning means in a predetermined pattern;

means for generating electrical signals corresponding to imagery in scanned portions of said photographs;

means for correlating corresponding portions of said generated electrical signals to detect relative time displacements therebetween, and producing height error signals in accordance therewith;

means responsive to said height error signals for independently varying the positions of the centers of the scanned portions of said photographs relative to each other, to establish time coincidence of said generated electrical signals;

a computer for calculating the altitudes of the imagery in the scanned portions of said photographs in accordance with photogrammetric data stored therein, and said height error signals supplied thereto; and printout means responsive to the altitudes calculated in said computer for printing out said altitudes on said photosensitive film sheet.

16. An automatic map compilation system for printing out information derived from scanning portions of a pair of stereoscopic photographs comprising:

support means for supporting a pair of stereoscopic photographs and a photosensitive film sheet in predetermined fixed positions thereon;

scanning means for electronically scanning predetermined portions of said stereoscopic photographs;

means for moving said support means in a predetermine& fixed pattern;

generating means for generating electrical signals corresponding to imagery in scanned portions of said photographs;

means for correlating corresponding portions of said generated electrical signals to detect relative time displacements therebetween and to produce height error signals in accordance there-. with;

a computer responsive to said height error signals and to photogrammetric information stored therein for controlling the synchronous scanning of substantially homologous portions of said stereoscopic photographs; and printout means responsive to said generated electrical signals corresponding to the scanned portions of said photographs printing out on said photosensitive film sheet image elements, so as to provide a record in orthographic projection corresponding to said stereoscopic photographs.

17. An automatic map compilation system for printing out information on photosensitive film sheets, said information out information on photosensitive film sheets, said information being derived by scanning incremental areas of a pair of stereoscopic photographs comprising:

a movable table on which a pair of stereoscopic photographs and a pair of photosensitive film sheets to be exposed in accordance with information derived from photographic detail in the stereoscopic photographs are adapted to be placed in fixed relationship to each other;

means for automatically moving said movable table in a predetermined pattern;

scanning means for scanning each of said photographs with an individually controllable raster;

movable lens means for directing the scanning rasters of said scanning means to selected incremental areas of said photographs;

a computer responsive to signals corresponding to the position of said movable table which is related to said pair of stereoscopic photographs and to photogrammetric data stored therein for directing the scanning rasters, which scan said photographs, to selected areas thereof;

means for modifying the photogrammetric data in accordance with the actual positions of the photographs as determined during an alignment process preparatory to automatically moving said movable table in said predetermined pattern;

means for generating signals corresponding to imagery in the scanned areas on the photographs;

means responsive to said generated signals for correlating corresponding portions of the signals to detect relative time displacements therebetween;

error detecting means responsive to the signals having relative time displacements for developing height and tilt error signals and applying them to said scanning means so as to vary the relative positions and shapes of the scanning rasters on the stereoscopic photographs in order to substantially eliminate the detected relative tinge displacements between the portions of said signals and establish time coincidence therebetween, said computer further being energized by said height error signals to correct the previously approximated altitude of the incremental area represented by the said incremental areas being scanned and further control the incremental scanned areas on the next scanning cycle by incorporating the corrected altitude in computations performed therein;

first printout means responsive to the corrected calculated altitudes in said computer for incrementally printing out on one of said photosensitive film sheets information corresponding to altitudes of said scanned incremental areas; and second printout means responsive to said generated signals corresponding to the scanned areas on the photographs for incrementally printing out on the other of said photosensitive film sheets image elements so as to provide a record in orthographic projection corresponding to said stereoscopic photographs.

18. In an automatic map compilation system, of the type in which a pair of stereoscopic photographs, supplied thereto, are positioned for scanning to derive data by scanning portions thereof, an alignment arrangement comprising:

means for positioning a pair of stereoscopic photographs with respect to one another;

means for electronically scanning said pair of stereoscopic photographs;

means for generating video signals corresponding to imagery in the scanned portions of the photographs;

a computer connected to control the scanning means;

means for applying appropriate photogrammetric information related to the pair of stereoscopic photographs to the computer for storage therein;

means for manually controlling the computer to cause the scanning of particular selected portions of the photographs;

remote electronic viewing means coupled to display a representation of the selected portions to an operator for use in aligning the corresponding selected portions of the respective photographs in order to compensate for any misalignment in the acutal positioning of said photographs with respect to one another;

means for supplying signals indicative of the coordinates of the selected portions of the photographs to the computer in order to modify the stored photogrammetric information stored therein; and means for printing selected marks on associated photosensitive sheets to designate positions corresponding to selected portions of the photographs.

19. An automatic map compilation system for deriving information from a pair of stereoscopic photographs supplied thereto by scanning incremental areas thereof comprising:

movable means for transporting and moving in a predetermined profiling pattern a pair of stereoscopic photographs fixed in position with respect to one another;

position indicating means for developing signals indicative of the position of said movable means with respect to predetermined references;

electronic scanning means individually associated with each of said stereoscopic photographs for scanning incremental areas of the photographs with controllable rasters;

a computer for controlling synchronous scanning of substantially homologous incremental areas of the photographs in accordance with specific photogrammetric data related to the particular stereoscopic photographs and their relative positions on said movable means;

means responsive to signals from the computer for directing the respective scanning rasters to the selected incremental areas on the photographs for synchronous scanning;

means for generating video signals corresponding to imagery in the scanned areas of the photographs;

error sensing means including correlating means responsive to said generated signals to detect relative time displacements therebetween, for developing height error signals in response thereto, said height error signals being supplied to said scanning means to cause a relative displacement between said scanning rasters, so as to minimize the relative time displacements between said correlated video signals, said computer further being energized by said height error signals to; adjust the previously estimated altitude of the incremental areas being scanned and further incorporate said adjusted altitude in calculating the position of homologous incremental areas on the photographs to be synchronously scanned; and means for printing out photographic detail derived from said video signals in orthographic relationship and altitude information pertaining to the scanned photographs, derived from the computer.

20. The system defined by claim 19 further comprising:

means responsive to the motion of said movable table for generating a signal indicative of the motion thereof; and means responsive to said motion indicating signal for generating deflecting signals so as to cause substantially zero displacement between the centers of the scanning rasters generated by said electronic scanning means and the centers of the incrementally scanned areas, while, said photographs are moved in said predetermined profiling pattern, 21. The system defined by claim 19 further comprising raster shaping means energized by signals representing height and tilt information of said incremental areas being scanned ant further energized by said positioning indicating means to produce compensating signals corresponding to tilt components of said scanned incremental areas and to energize said scanning means therewith for controlling the sizes and shapes of said scanning rasters so as to scan substantially homologous incremental areas.

22. The system defined by claim 19 further comprising:

means for applying a servo error signal from said means responsive to signals from the computer to said electronic scanning means to deflect said scanning rasters to compensate for errors in the positioning of said means responsive to signals from the computer.

23. The system defined by claim 19 wherein said error sensing means further includes means responsive to said generated video signals to eliminate predetermined frequency components therefrom, and to detect relative time displacements therebetween, for developing height error signals in response thereto in combination with the signals developed by said correlating means included in said error sensing means, said height error signals being supplied to said scanning means to cause a relative displacement between said scanning rasters so as to minimize the relative time displacements between said video signals.

24. In an automatic map compilation system of the type, scanning portions of a pair of stereoscopic photographs supplied thereof, to derive information therefrom, an arrangement, comprising:

first and second movable means for transporting and moving a pair of stereoscopic photographs;

electronic scanning means associated with each of said stereoscopic photographs for scanning at least portions thereof and developing video signals in accordance with the imagery contained therein;

computing means for cyclically estimating for each cycle of operation of said computer means estimating on the basis of photogrammetric data related to said pair of stereoscopic photographs stored in said computing means positions of portions of said photographs which represent homologous imagery and controlling said first and second movable means to move said photographs with respect to said electronic scanning means to cause the synchronous scanning of said portions which represent homologous imagery;

error sensing means responsive to said video signals for analyzing said video signals therein and producing error signals which represent the degree of error of said computing means in estimating said portions as representing homologous imagery; and means for energizing said computing means with said error signals so as to update the photogrammetric data related to said portions which have been synchronously scanned, and store said updated data therein.

25. The system defined by claim 24 further including:

third movable means responsive to controlling signals from said computing means for transporting and moving a material having a photosensitive surface; and output means responsive to said video signals for producing an orthographic recording of imagery in said pair of stereoscopic photographs by exposing a portion of said material having a photosensitive surface with light signals corresponding to said video signals which are developed by said electronic scanning means.

26. The system defined by claim 24 further including:

means responsive to controlling signals from said computing means for transporting and moving a material having a photosensitive surface; and output means responsive to signals from said computing means, said signals representing updated altitude information derived from said updated photogrammetric data related to said portions of said pair of stereoscopic photographs which have been synchronously scanned, for producing an altitude chart represented by the imagery in said pair of stereoscopic photographs by exposing a portion of said material having, a photosensitive surface with said signals.

27. In an automatic map compilation system, in which, incremental areas, of a pair of stereoscopic photographs supplied thereto, are scanned to derive information therefrom the arrangement comprising:

table means for mounting and moving at least a pair of stereoscopic photographs in a predetermined profiling pattern said photographs being fixedly mounted on said table means;

means including computing means and scanning means for scanning portions of said at least pair of stereoscopic photographs with rasters of predetermined patterns and configurations; and means responsive to signals derived from said table means for energizing said scanning means so that the centers of said rasters substantially follow the centers of said portions of said photographs as controlled by said computing means, as said photographs are being moved by said table means in said predetermined profiling pattern.

28. In a mapping system an arrangement for synchronizing the position of an electronically deflected scanning beam to follow a moving object to be scanned during particular repetitive intervals comprising:

means for generating an electrical signal indicative of the motion of said object;

dual channel integrators for integrating said signal;

means for alternatively discharging said integrators as said moving object passes predetermined points; and means for alternatively energizing said electronically deflected beam with the outputs of the respective integrators in synchronism with independent timing pulses by switching between the outputs thereof so as to deflect the beam in accordance with the selected integrator output.

29. In a mapping system of the type wherein information is derived from scanning an object, an arrangement for controlling scanning means which scan with a raster of a predetermined configuration a portion of a movable object so that the center of said raster follows the center of the portion of said movable object including:

Optical encoding means for detecting movement of said movable object and producing signals in accordance therewith; and means responsive to said signals for producing output signals whose characteristics are related to the movement of said movable object and to energize said scanning means therewith so that the center of the raster of said scanning means substantially follows the center of the scanned portion of said object.

30. In an automatic map compilation system, wherein video signals are produced by electronically scanning incremental areas of a pair of stereoscopic photographs supplied thereto said incremental areas being selected by a computer for each cycle of operation thereof on the basis of photogrammetric data supplied thereto and altitude data previously updated therein so as to scan substantially homologous incremental areas, the arrangement comprising:

error sensing means including first and second correlating means, said first correlating means being responsive to said generated video signals to detect relative time displacements therebetween and producing a first height error sensing signal in response thereto, said second correlating means being responsive to a selected frequency bandwidth of the generated video signals for detecting relative time displacements therebetween and developing a second height error signal, said error sensing means further including means for combining said first and second height error signals and producing an output height error signal which is indicative of the degree of error in the selection of said incremental areas as representing homologous areas by said computer.

31. In an automatic map compilation system, wherein video signals are produced by scanning with scanning means in predetermined raster patterns and configurations incremental areas of a pair of stereoscopic photographs supplied thereto, said incremental areas having been selected on the basis of photogrammetric data related to said pair of photographs and data related to contiguous incremental areas by computing means as representing homologous imagery, the arrangement comprising:

height error sensing means responsive to said video signals for correlating the signals therein, and developing height error signals which are indicative of the degree of error in the selection of said incremental areas by said computing means as representing homologous imagery; and electronic raster shape means responsive to said video signals and including means for switching said signals therein in a predetermined timing sequence as a function of said predetermined configurations of said rasters for producing slope-defining signals as a function of detected incremental altitude variations within said incremental areas being scanned, said computing means being adapted to be energized by said signals indicative of incremental altitude variations within said incremental areas being scanned.

32. In an automatic map compilation system, wherein video signals are produced by scanning with scanning means in predetermined raster patterns and configurations, incremental areas of a pair of stereoscopic photographs, supplied to said, the incremental areas being selected as representing homologous imagery by computing means on the basis of photogrammetric data related to said pair of photographs, and data related to contiguous incremental areas, the arrangement comprising:

height error sensing means responsive to said video signals for correlating the signals therein and developing height error signals which are related to the degree of error in the selection of said incremental areas by said computing means as representing homologous imagery;

electronic raster shape means responsive to said video signals and including means for switching said video signals therein in a predetermined timing sequence as a function of said predetermined configurations of said rasters for producing slope signals as a function indicative of incremental altitude variations within said incremental areas being scanned; and means responsive to said slope for energizing said scanning means so that the configurations of said rasters may be shaped in accordance therewith, thereby further controlling the raster configurations for scanning said incremental areas of said pair of stereoscopic photographs which represent homologous imagery.

33. In an automatic mapping system, in which a pair of stereoscopic terrain photographs supplied thereto are scanned to record information therefrom, the combination comprising:

means for positioning a pair of stereoscopic terrain photographs in a controllable relationship to one another including means for moving said pair of stereoscopic terrain photographs along a predetermined profiling pattern with respect to preselected references;

means for electronically scanning said photographs;

means for generating video signals corresponding to terrain imagery in portions of the scanned photographs;

a digital computer coupled to control the scanning means;

correlation circuitry responsive to said video signals for developing height error signals;

raster shaping means energized by signals from said computer corresponding to height and tilt information stored therein and further energized by signals from said positioning means corresponding to the position of said pair of photographs with respect to said preselected references for developing tilt compensating signals for energizing said scanning means to control the size and shape of the scanned portions of said photographs so that they correspond to substantially homologous terrain incremental areas; and means for recording altitude and terrain photographic information derived from the synchronously scanned homologous areas of the stereoscopic photographs.

34. In an automatic mapping system, in which a pair of stereoscopic terrain photographs supplied thereto are scanned to record information therefrom, the combination comprising:

means for positioning a pair of stereoscopic photographs in a controllable relationship to one another including means for moving said pair of stereoscopic photographs along a predetermined profiling pattern with respect to preselected references;

means for electronically scanning said photographs; .

means for generating video signals corresponding to imagery in portions of the scanned photographs;

a digital computer coupled to control the scanning means;

correlation circuitry responsive to said video signals for developing height error signals; and raster shaping means energized by signals from said computer corresponding to height and tilt information stored therein and further energized by signals from said positioning means corresponding to the position of said pair of photographs with respect to said preselected references for developing tilt compensating signals for energizing said scanning means to control the size and shape of the scanned portions of said photographs so that they correspond to substantially homologous incremental areas.

35. In an automatic map compilation system, wherein video signals are produced by electronically scanning incremental areas of a pair of stereoscopic photographs supplied thereto, said incremental areas being selected by a included in said system on the basis of prestored photogrammetric data and altitude data previously updated, so as to scan substantially homologous areas, said video signals being correlated to produce height and tilt error signals, said height error signals being used to vary the relative positions of the scanned areas so as to synchronously scan substantially homologous areas, the arrangement comprising:

raster shaping means energized by said tilt error signals corresponding to tilt components of the incremental areas being scanned, and further energized by position indicating means which relate the positions of the photographs with respect to predetermined references to said prestored photogrammetric data for producing tilt compensating signals to control the sizes and shapes of the incremental areas being scanned as a function of effective tilt directions of the incremental areas being scanned.

36. In an automatic map compilation system wherein a pair of stereoscopic photographs are scanned to derive information therefrom the combination comprising:

means for electronically scanning a pair of stereoscopic photographs;

means for generating video signals corresponding to imagery in scanned portions of the photographs;

a digital computer for controlling, for each cycle of operation thereof the portions of the photographs to be scanned in accordance with preprogrammed photogrammetric data related to said pair of stereoscopic photographs, stored therein; and correlation circuitry responsive to said video signals for developing error signals, said circuitry including threshold circuit means responsive to a preselected correlation level for providing an inhibiting signal when the correlation of said video signals falls below said selected level.

37. An automatic map compilation system adapted to derive information from a pair of stereoscopic photographs supplied thereto comprising:

movable means for transporting and moving a pair of stereoscopic photographs;

position indicating means for developing signals indicative of the position of said movable means with respect to predetermined references;

electronic scanning means individually associated with each of said photographs for scanning incremental areas of the photographs with controllable rasters;

a computer for controlling synchronous scanning of substantially homologous incremental areas of the photographs in accordance with specific photogrammetric data related to the particular stereoscopic photographs and their positions on said movable means;

means responsive to signals from the computer for directing the respective scanning rasters to the selected incremental areas on the photographs for synchronous scanning;

means for generating video signals corresponding to imagery in the scanned areas of the photographs;

error sensing means, including differential delay means correlating means responsive to said generated signals to determine the magnitudes of any relative time displacements therebetween, for developing height error signals corresponding to said magnitudes to energize said computer so that previously estimated altitudes of the incremental areas being scanned are updated therein for calculating the positions of homologous incremental areas on the photographs be synchronously scanned; and means for printing out image detail derived from said video, signals and altitude information derived from the computer pertaining to the scanned photographs.

38. In an automatic map compilation system wherein video signals are produced by electronically scanning incremental areas of stereoscopic photographs in a predetermined pattern consisting of a predetermined number of scanning lines, the selection of the areas being controlled by a computer as a function of calculations performed therein based on prestored photogrammetric data and altitude data previously updated so as to scan substantially homologous terrain areas, said video signals being correlated to produce height and tilt error signals, used to vary the computer selected scanned areas so as to synchronously scan substantially homologous areas, the arrangement comprising:

Y-parallax compensating means, including correlation circuitry, for producing signals in response to Y-parallax in a direction perpendicular to a line at which said photographs were recorded, by correlating the video signals corresponding to the areas of the photographs scanned in predetermined scanning patterns, and predetermined relative time displacements being introduced in said video signals so as to produce signals indicative of Y-parallax in said photographs, said Y-parallax compensating means further including means responsive to said correlation signal to further vary the relative areas synchronously scanned so as to compensate for any parallax therein, 39. The system defined by claim 38 wherein said video signals are time displaced relative to each other by a delay equal to a multiple of the time necessary to generate a complete scanning line within said patterns so as to produce said signals indicative of Y-parallax in said photographs.

40. The system defined by claim 38 wherein the correlated video signals produced by scanning incremental areas selected by said computer for synchronous scanning which have been relatively displaced in a first direction with respect to one another in the parallax determining direction are compared with correlated video signals produced by scanning said incremental areas which have been displaced relative to one another in said parallax determining direction but opposite in polarity from said first displacement, the resultant of the compared signals producing said signal indicative of parallax in said photographs in the direction of displacement.

41. An automatic map compilation system for recording data, derived by scanning incremental areas of a pair of stereoscopic photographs supplied thereto comprising:

support means for supporting and moving a pair of stereoscopic photographs, fixedly supported thereon means for synchronously scanning in a predetermined pattern consisting of a series of sequentially generated scanning lines, incremental areas of the stereoscopic photographs and developing signals in accordance therewith;

means responsive to said signals and photogrammetric data related to said photographs for controlling said scanning means so that incremental areas representing substantially homologous imagery on said photographs are synchronously scanned; and means for recording altitude data and photographic detail derived from the synchronously scanned homologous incremental areas of the stereoscopic photographs.

42. The system defined by claim 41 further including, means for controlling said sequentially generated scanning lines scan to substantially contiguous terrain strips within said incremental areas, the entire areas being scanned in a preselected direction.

43. The system defined by claim 44 further including means for controlling said sequentially generate scanning lines of said series so that successive lines scan noncontiguous terrain strips within opposing halves of each of said incremental areas in accordance with a predetermined pattern, the entire areas being scanned by the complete series of the sequentially generated scanning lines.

44. A scanning system for scanning a surface comprising:

means for electronically scanning a surface in a predetermined series of sequentially generated scanning lines each line, scanning an equal strip of said surface from one end thereof to the other; and means for deflecting successive lines of said series so that predetermined noncontiguous strips of said surface are successively scanned with the entire surface being scanned by said predetermined series of sequentially generated scanning lines.

45. A system for scanning a surface comprising:

means for electronically scanning a surface in a predetermined series of sequentially generated scanning lines each line, scanning an equal strip of said surface from one end there to the other; and means for deflecting successive lines of said series so that predetermined strips of opposing halves of said surface are successively scanned and so that said surface is substantially scanned by said predetermined series of sequentially generated scanning lines.

* * * * *